(12) United States Patent
Kurita et al.

(10) Patent No.: US 12,148,919 B2
(45) Date of Patent: *Nov. 19, 2024

(54) COMPOSITE CARBON PARTICLES AND USE THEREOF

(71) Applicant: SHOWA DENKO K. K., Tokyo (JP)

(72) Inventors: Takayuki Kurita, Tokyo (JP); Kohei Akimoto, Tokyo (JP); Yuji Ito, Tokyo (JP); Hirofumi Inoue, Tokyo (JP); Jinseok Baek, Tokyo (JP)

(73) Assignee: Group14 Technologies, Inc., Woodinville, WA (US)

(*) Notice: Subject to any disclaimer, the term of this patent is extended or adjusted under 35 U.S.C. 154(b) by 6 days.

This patent is subject to a terminal disclaimer.

(21) Appl. No.: 17/927,785

(22) PCT Filed: May 28, 2021

(86) PCT No.: PCT/JP2021/020496
§ 371 (c)(1),
(2) Date: Nov. 25, 2022

(87) PCT Pub. No.: WO2021/241747
PCT Pub. Date: Dec. 2, 2021

(65) Prior Publication Data
US 2023/0231111 A1    Jul. 20, 2023

(30) Foreign Application Priority Data

May 28, 2020 (JP) .................................. 2020-093159
Jan. 15, 2021 (JP) .................................. 2021-005094
Jan. 15, 2021 (JP) .................................. 2021-005095

(51) Int. Cl.
*H01M 4/36*    (2006.01)
*C01B 32/318*    (2017.01)
(Continued)

(52) U.S. Cl.
CPC .......... *H01M 4/364* (2013.01); *C01B 32/318* (2017.08); *C01B 32/336* (2017.08);
(Continued)

(58) Field of Classification Search
CPC ..................................................... H01M 4/133
See application file for complete search history.

(56) References Cited

U.S. PATENT DOCUMENTS 6,631,073 B1 * 10/2003 Sakata ................... H01G 11/24
361/303
10,424,786 B1    9/2019 Mason et al.
(Continued)

FOREIGN PATENT DOCUMENTS

CN    102214823 A    10/2011
CN    108475779 A    8/2018
(Continued)

*Primary Examiner* — Khanh T Nguyen
(74) *Attorney, Agent, or Firm* — Seed IP Law Group LLP

(57) ABSTRACT

Composite carbon particles including a porous carbon material and a silicon component, the composite carbon particle having an average aspect ratio of 1.25 or less, and a ratio ($I_{Si}/I_G$) of a peak intensity ($I_{Si}$) in the vicinity of 470 cm$^{-1}$ to a peak intensity ($I_G$) in the vicinity of 1580 cm$^{-1}$ as measured by Raman spectroscopy of 0.30 or less, wherein the porous carbon material satisfies $V_1/V_0>0.80$ and $V_2/V_0<0.10$, when a total pore volume at a maximum value of a relative pressure $P/P_0$ is defined as $V_0$ and $P_0$ is a saturated vapor pressure, a cumulative pore volume at a relative pressure $P/P_0=0.1$ is defined as $V_1$, a cumulative pore volume at a relative pressure $P/P_0=10^{-7}$ is defined as $V_2$ in a nitrogen adsorption test, and has a BET specific surface area of 800 m$^2$/g or more.

13 Claims, 1 Drawing Sheet

Enlarged View

(51) Int. Cl.
  *C01B 32/336*    (2017.01)
  *H01M 4/04*     (2006.01)
  *H01M 4/133*     (2010.01)
  *H01M 4/38*     (2006.01)
  *H01M 4/583*     (2010.01)
  *H01M 4/587*     (2010.01)
  *H01M 4/62*     (2006.01)
  *H01M 10/0525*    (2010.01)
  *H01M 4/02*     (2006.01)

(52) U.S. Cl.
  CPC ......... *H01M 4/0404* (2013.01); *H01M 4/133* (2013.01); *H01M 4/366* (2013.01); *H01M 4/386* (2013.01); *H01M 4/583* (2013.01); *H01M 4/587* (2013.01); *H01M 4/622* (2013.01); *H01M 4/625* (2013.01); *H01M 10/0525* (2013.01); *C01P 2002/74* (2013.01); *C01P 2002/82* (2013.01); *C01P 2004/03* (2013.01); *C01P 2004/32* (2013.01); *C01P 2004/54* (2013.01); *C01P 2004/61* (2013.01); *C01P 2004/80* (2013.01); *C01P 2006/12* (2013.01); *C01P 2006/16* (2013.01); *C01P 2006/40* (2013.01); *H01M 2004/021* (2013.01); *H01M 2004/027* (2013.01)

(56) References Cited

U.S. PATENT DOCUMENTS

| | | |
|---|---|---|
| 2013/0004841 A1 | 1/2013 | Thompkins et al. |
| 2013/0130115 A1 | 5/2013 | Park et al. |
| 2017/0152340 A1 | 6/2017 | Geramita et al. |
| 2019/0267622 A1 | 8/2019 | Sakshaug et al. |
| 2019/0355971 A1 | 11/2019 | Kim |
| 2020/0152973 A1 | 5/2020 | Mason et al. |

FOREIGN PATENT DOCUMENTS

| | | |
|---|---|---|
| CN | 108565437 A | 9/2018 |
| GB | 2584615 A | 12/2020 |
| JP | 11-339796 A | 12/1999 |
| JP | 2007-8790 A | 1/2007 |
| JP | 2007-39289 A | 2/2007 |
| JP | 3897709 B2 | 3/2007 |
| JP | 2009-49236 A | 3/2009 |
| JP | 2010-95390 A | 4/2010 |
| JP | 2010-525549 A | 7/2010 |
| JP | 2012-119079 A | 6/2012 |
| JP | 2014-511322 A | 5/2014 |
| JP | 2014-523468 A | 9/2014 |
| JP | 2015-50050 A | 3/2015 |
| JP | 2015-130287 A | 7/2015 |
| JP | 2016-132608 A | 7/2016 |
| JP | 2016-166116 A | 9/2016 |
| JP | 2017-88443 A | 5/2017 |
| JP | 2017-222547 A | 12/2017 |
| JP | 2018-32588 A | 3/2018 |
| JP | 6328107 B2 | 5/2018 |
| JP | 2018-534720 A | 11/2018 |
| JP | 2019-145212 A | 8/2019 |
| JP | 2019-179679 A | 10/2019 |
| KR | 10-2018-0113187 A | 10/2018 |
| KR | 10-2019-0122805 A | 10/2019 |
| WO | 2008/081883 A1 | 7/2008 |
| WO | 2015/019994 A1 | 2/2015 |
| WO | 2018/163778 A1 | 9/2018 |
| WO | 2019/031597 A1 | 2/2019 |
| WO | 2019/131861 A1 | 7/2019 |
| WO | 2019/131862 A1 | 7/2019 |
| WO | 2020/095067 A1 | 5/2020 |

\* cited by examiner

[Fig. 1]
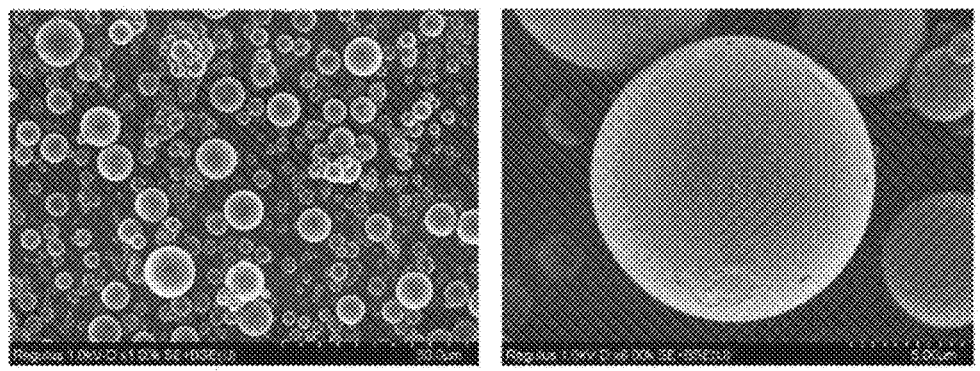
Enlarged View
[Fig. 2]
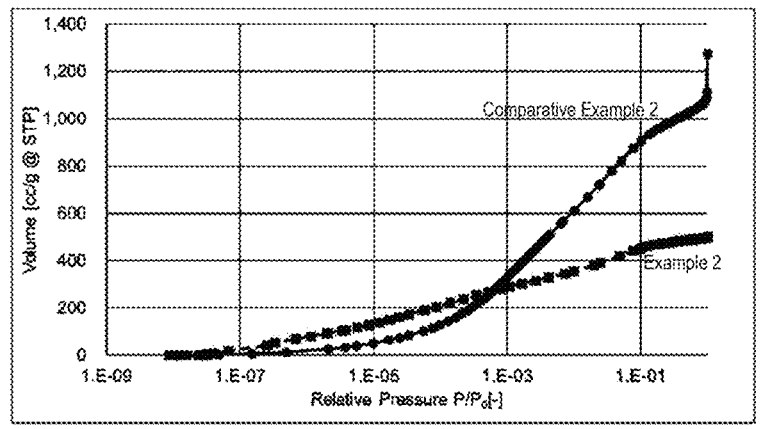
(a) Adsorption Isotherm
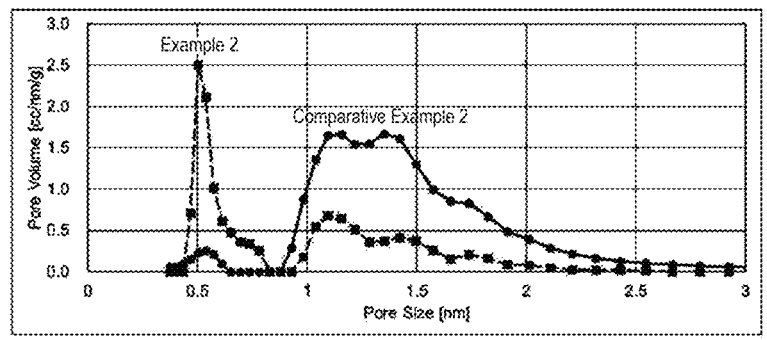
(b) Pore Size And Pore Volume

US 12,148,919 B2

COMPOSITE CARBON PARTICLES AND USE THEREOF

This Application is a National Stage of International Application No. PCT/JP2021/020496 filed May 28, 2021, claiming priority based on Japanese Patent Application No. 2020-093159 filed May 28, 2020, Japanese Patent Application No. 2021-00594 filed Jan. 15, 2021, and Japanese Patent Application No. 2021-005095 filed Jan. 15, 2021.

TECHNICAL FIELD

The present invention relates to novel composite carbon particles, an electrode material for a lithium-ion secondary battery comprising the composite carbon particles, and a lithium-ion secondary battery.

BACKGROUND ART

Secondary batteries used in IT devices such as smartphones and tablet PCs, vacuum cleaners, electric tools, electric bicycles, drones, and automobiles require negative electrode active materials with high capacity and high output. Silicon (theoretical specific capacity: 4200 mAh/g), which has a higher theoretical specific capacity than currently used graphite (theoretical specific capacity: 372 mAh/g), has attracted attention as a negative electrode active material.

However, silicon (Si) expands and contracts in volume up to about 3 to 4 times in association with electrochemical insertion and deinsertion of lithium. As a result, the silicon particles collapse or are separated from the electrode, and thus it is known that the lithium-ion secondary battery using silicon has extremely low cycle characteristics. For this reason, instead of simply replacing graphite with silicon, it is now being actively studied to use a structure in which the degree of expansion and contraction of the negative electrode material as a whole is reduced. Among them, many attempts have been made to form a composite with carbon materials.

As a negative electrode material having a high capacity and a long life, there is disclosed a silicon-carbon composite material obtained by a method in which silicon is created in the pores of the porous carbon by subjecting the porous carbon particles to silane gas at elevated temperature (JP2018-534720A; Patent Literature 1).

Patent Literature 2, JP6328107B, further discloses a battery electrode composition comprising core-shell composites, the composites comprising: an active material provided to store and release metal ions during battery operation, whereby the storing and releasing of the metal ions causes volume changes greater than 7% of the active material; a collapsible core disposed in combination with the active material to accommodate the changes in volume and deformed irreversibly in response to the storing and releasing of the metal ions; and a shell at least partially encasing the active material and the core, the shell being formed from a material that is substantially permeable to the metal ions stored and released by the active material.

Patent Literature 3, JP3897709B, further discloses an electrode material comprising composite particles containing a material containing an element (such as silicon) capable of forming an alloy with lithium and a conductive material, wherein a ratio of the material containing the element capable of forming an alloy with lithium to a total mass of the composite particles is 30% by mass or more and 80% by mass or less, the composite particles are spherical in shape, have a void inside thereof, Vs is 35% or more and 70% or less, where a tapped bulk density of the composite particles measured based on JIS R 1628 is $D_1$ (g/cm$^3$), a true density of the composite particles is $D_2$ (g/cm$^3$), and a void volume occupation rate (%) of the composite particles is $Vs=(1-1.35\times D_1/D_2)\times 100$.

CITATION LIST

Patent Literature

Patent Literature 1: JP2018-534720A
Patent Literature 2: JP6328107B
Patent Literature 3: JP3897709B

SUMMARY OF INVENTION

Technical Problem

In the silicon-carbon composite material disclosed in Patent Literature 1, a porous carbon material is impregnated with silicon to suppress a volume change associated with adsorption and desorption of lithium-ions. However, since the structure of the porous carbon material itself is not controlled, a problem of insufficient cycle characteristics owing to expansion and contraction when formed into an electrode has been existing.

Patent Literatures 2 and 3 disclose spherical silicon-carbon composite particles in the drawings and the like, but the pore distribution and the state of presence of silicon in the particles are not sufficiently understood, and the cycle characteristics thereof are not always satisfactory.

Therefore, an object of the present invention is to provide silicon-carbon composite particles having excellent cycle characteristics.

Solution to Problem

As a result of intensive studies in order to solve the above problems, the present inventors have found that the above problems can be sufficiently solved by satisfying predetermined requirements, and have thus completed the present invention.

The configuration of the present invention is as follows:
[1] Composite carbon particles comprising a porous carbon material and a silicon component, the composite carbon particle having an average aspect ratio of 1.25 or less, and a ratio ($I_{Si}/I_G$) of a peak intensity ($I_{Si}$) in the vicinity of 470 cm$^{-1}$ to a peak intensity ($I_G$) in the vicinity of 1580 cm$^{-1}$ as measured by Raman spectroscopy of 0.30 or less.

Here, the porous carbon material satisfies $V_1/V_0>0.80$ and $V_2/V_0<0.10$, when a total pore volume at a maximum value of a relative pressure P/P$_0$ is defined as $V_0$ and P$_0$ is a saturated vapor pressure, a cumulative pore volume at a relative pressure P/P$_0$=0.1 is defined as $V_1$, a cumulative pore volume at a relative pressure P/P$_0$=10$^{-7}$ is defined as $V_2$ in a nitrogen adsorption test, and has a BET specific surface area of 800 m$^2$/g or more.
[2] The composite carbon particles according to [1], wherein the porous carbon material satisfies $V_3/V_0>0.50$, when a cumulative pore volume at the relative pressure P/P$_0$=10-2 is defined as $V_3$ in the nitrogen adsorption test.
[3] The composite carbon particles according to [1] or [2], wherein the silicon component is adhered to inner wall of pores of the porous carbon material.

[4] The composite carbon particles according to any one of [1] to [3], wherein a 50% particle size ($D_{V50}$) in a volume-based cumulative particle size distribution by laser diffraction method is 4.0 μm or more and 30.0 μm or less, a 10% particle size ($D_{V10}$) is 1.0 μm or more, and the BET specific surface area is 0.50 m$^2$/g or more and 40.0 m$^2$/g or less.

[5] The composite carbon particles according to any one of [1] to [4], wherein an R value ($I_D/I_G$), which is a ratio of a peak intensity ($I_D$) in the vicinity of 1350 cm$^{-1}$ to a peak intensity ($I_G$) in the vicinity of 1580 cm$^{-1}$ in a Raman spectrum, is 0.80 or more and 1.50 or less.

[6] The composite carbon particles according to any one of [1] to [5], wherein in an XRD pattern using a Cu-Kα ray, a full width at half maximum of a peak of a 111 plane of Si is 3.00° or more and (peak intensity of a 111 plane of SiC)/(peak intensity of the 111 plane of Si) is 0.01 or less.

[7] The composite carbon particles according to any one of [1] to [6], wherein a content of the silicon component in the composite carbon particles is 15% by mass or more and 85% by mass or less.

[8] The composite carbon particles according to any one of [1] to [7], wherein the composite carbon particle has an average circularity of 0.95 or more and 1.00 or less.

[9] The composite carbon particles according to any one of [1] to [8], further comprising inorganic particles and a polymer on a portion or the entire surface of the composite carbon particles, wherein the inorganic particles contain one or more selected from graphite and carbon black, and a content of the polymer is 0.1 to 10.0% by mass.

[10] An electrode material for a lithium-ion secondary battery comprising the composite carbon particles any one of [1] to [9].

[11] A negative electrode material comprising the composite carbon particles according to any one of [1] to [9].

[12] A negative electrode mixture layer comprising the negative electrode material according to [11].

[13] A lithium-ion secondary battery comprising the negative electrode mixture layer according to [12].

Advantageous Effects of Invention

According to the composite carbon particles of the present invention, it is possible to provide a composite material having a low average aspect ratio in which silicon is adhered inner wall of pores of the porous carbon material. By using this composite material, it is possible to provide a lithium-ion secondary battery having good cycle characteristics and small electrode expansion.

BRIEF DESCRIPTION OF DRAWINGS

FIG. 1 shows scanning electron micrographs of composite carbon particles obtained in Example 2.

FIG. 2 shows adsorption isotherm and pore volume distribution of a porous carbon material used in Example 2 and Comparative Example 2.

DESCRIPTION OF EMBODIMENTS

Hereinafter, an embodiment of the present invention will be described.

<1> Composite Carbon Particles

Composite carbon particles according to an embodiment of the present invention are composite carbon particles containing a porous carbon material and a silicon component, in which the composite carbon particle has an average aspect ratio of 1.25 or less, and a ratio ($I_{Si}/I_G$) of a peak intensity ($I_{Si}$) in the vicinity of 470 cm$^{-1}$ to a peak intensity ($I_G$) in the vicinity of 1580 cm$^{-1}$ as measured by Raman spectroscopy of 0.30 or less.

When the average aspect ratio of the composite carbon particles is 1.25 or less, the shape of the composite carbon particles is isotropic, so that it is possible to suppress the shape change during the insertion and deinsertion of lithium and the cracking of the material. From the same viewpoint, the average aspect ratio is preferably 1.20 or less, more preferably 1.15 or less.

The average aspect ratio can be measured by the method described in Examples. For example, in the present invention, the aspect ratio is defined as the ratio of the major axis and the minor axis of the shape cross-section of the composite carbon particle obtained by analyzing an image of the composite carbon particles by a scanning electron microscope (SEM) with image analysis software. Such an analysis is performed on 100 composite carbon particles randomly selected from the SEM photograph, and the obtained aspect ratios are averaged to define an average aspect ratio. Examples of the image analysis software includes ImageJ (developed at US National Institutes of Health).

The silicon has a peak in the vicinity of 470 cm$^1$ in the Raman spectrum measured by Raman spectroscopy. The intensity of this peak is defined as $I_{Si}$. Specifically, the silicon has a peak at 460 to 490 cm$^{-1}$. It is preferable that the silicon does not have a peak at 510 to 530 cm$^{-1}$.

The peak intensity in the vicinity of 1350 cm$^{-1}$ is defined as $I_D$, and the peak intensity in the vicinity of 1580 cm$^{-1}$ is defined as $I_G$. The peak intensity is the height from the baseline to the peak apex after the baseline is corrected. The peak in the vicinity of 1350 cm$^{-1}$ and the peak in the vicinity of 1580 cm$^{-1}$ are carbon-derived.

The composite carbon particles according to the present embodiment have a ratio ($I_{Si}/I_G$) of the peak intensity ($I_{Si}$) to the peak intensity ($I_G$) of 0.30 or less. The fact that the peak of silicon appears in the Raman spectrum indicates that silicon is deposited in the vicinity of the surface of the composite carbon particles, but when $I_{Si}/I_G$ is 0.30 or less, silicon is mainly deposited inside the pores of the carbon material and is hardly deposited on the surface of the carbon material, and this leads to an improvement in cycle characteristics in that silicon is not in direct contact with the electrolytic solution and that the porous carbon material absorbs expansion and contraction of silicon. From the same viewpoint, $I_{Si}/I_G$ is preferably 0.25 or less. Further, $I_{Si}/I_G$ is preferably 0.10 or more. When $I_{Si}/I_G$ is 0.10 or more, silicon is present at a sufficient concentration near the surface of the composite carbon particles, and the rate response is excellent.

<2> Porous Carbon Material

In the present invention, the porous carbon material satisfies $V_1/V_0>0.80$ and $V_2/V_0<0.10$, when a total pore volume at the maximum value of a relative pressure $P/P_0$ is defined as $V_0$, wherein $P_0$ is a saturated vapor pressure, the cumulative pore volume at a relative pressure $P/P_0=0.1$ is defined as $V_1$, the cumulative pore volume at a relative pressure $P/P_0=10^{-7}$ is defined as $V_2$ in the nitrogen adsorption test, and has the BET specific surface area of 800 m$^2$/g or more.

The maximum value of the relative pressure $P/P_0$ is the ratio of the maximum attainable pressure of nitrogen gas to the saturated vapor pressure $P_0$ of nitrogen gas under the measuring apparatus and conditions used in the nitrogen adsorption test. Although the maximum value of the relative pressure $P/P_0$ is theoretically 1, there are cases where the maximum value cannot reach 1 due to restrictions of the measuring apparatus, or the like, so that the maximum value of the relative pressure $P/P_0$ may be 0.985 or more and 1 or less.

To investigate the pore structure of the porous carbon material, an adsorption isotherm by a gas adsorption method, for example, is analyzed by a known method. The adsorption gas in the measurement is nitrogen gas in the present invention. That is, a nitrogen adsorption test is performed.

The adsorption isotherm is a curve in which the horizontal axis represents the relative pressure and the vertical axis represents the adsorption amount of the adsorption gas. At a lower relative pressure, the adsorption gas is adsorbed in pores having a smaller diameter. Although it is difficult to uniquely determine the pore size from the adsorption isotherm, as used herein, pores corresponding to nitrogen adsorption volumes in the range of $P/P_0 \leq 0.1$ are defined as micropores, pores corresponding to nitrogen adsorption volumes in the range of $0.1 < P/P_0 \leq 0.96$ are defined as mesopores, and pores corresponding to nitrogen adsorption volumes in the range of $0.96 < P/P_0$ are defined as macropores. According to a general definition, "mesopores" are pores having a diameter of about 2 nm to about 50 nm, while "micropores" are pores having a diameter less than about 2 nm, and "macropores" are pores having a diameter greater than about 50 nm.

$V_0$ represents the total pore volume [$cm^3/g$] in the standard state (0° C., 1 atm), and $V_1$ represents the sum of the pore volumes [$cm^3/g$] of the micropores in the standard state (0° C., 1 atm). Therefore, when $V_1/V_0$ is greater than 0.80, it means that the ratio of the micropores to the total pores is large, and at the same time, the ratio of the mesopores and the macropores is small. Since the ratio of the mesopores and the macropores is small, when the silicon component is adhered to inner wall of the pores of the porous carbon material by precipitation or the like, the ratio of the silicon component having the size formed in the composite carbon particles is reduced. From this viewpoint, $V_1/V_0$ is preferably 0.85 or more and more preferably 0.90 or less.

Further, in the composite carbon particles according to the present embodiment, the porous carbon material satisfies $V_2/V_0 < 0.10$, when the cumulative pore volume at the relative pressure $P/P_0 = 10^{-7}$ is defined as $V_2$ in the nitrogen adsorption test. It is preferable that $V_2/V_0 \leq 0.09$ is satisfied.

$V_2$ represents the sum of the volumes of very small micropores [$cm^3/g$] in the standard state (0° C., 1 atm). The fact that $V_2/V_0$ is smaller than 0.10 indicates that the abundance ratio of the micropores that are so small that the silicon-containing gas for precipitating the silicon component cannot enter is small. Therefore, it is possible to prevent a situation in which the capacity of the battery is low due to a large number of pores in which the silicon component is not present. "Very small micropores" means pores corresponding to nitrogen adsorption volumes at a relative pressure $P/P_0$ of $10^{-7}$ or less, and pores having a pore diameter of about 0.4 nm or less as measured by the Horvath-Kawazoe method (HK method).

Further, in the composite carbon particles according to the present embodiment, it is preferable that the porous carbon material satisfies $V/V_0 > 0.50$, when the cumulative pore volume at the relative pressure $P/P_0 = 10^{-2}$ is defined as $V_3$ in the nitrogen adsorption test. More preferably, $V_3/V_0 \geq 0.60$, and still more preferably $V_3/V_0 \geq 0.70$ is satisfied. $V_3$ is the sum of volumes [$cm^3/g$] of the pores having a size corresponding to a relative pressure $P/P_0$ of $10^{-2}$ or less in the standard state (0° C., 1 atm). Although it is difficult for the silicon component to precipitate in such pores, it does not mean that the silicon component does not precipitate at all. The fact that $V_3/V_0$ is within the above range means that a certain amount of pores in which the silicon component is precipitated and pores in which the silicon component is not precipitated are present in the composite carbon particles. As a result, the silicon component for insertion of lithium is sufficiently present in the composite carbon particles, and at the same time, when lithium is inserted and deinserted, the pores in which silicon is not precipitated sufficiently absorb the volume change due to the expansion and contraction of the silicon component, so that the expansion and contraction of the composite carbon particles can be suppressed to be small, which leads to suppression of the expansion and contraction of the electrode. Therefore, it is possible to improve the capacity of the lithium-ion secondary battery and the durability in long-term use.

On the other hand, when $V_3/V_0$ becomes too large, it becomes more difficult for the silicon component to precipitate. Therefore, it is preferable that $V_3/V_0 < 0.90$ is satisfied.

In the present embodiment, the total pore volume $V_0$ in the nitrogen adsorption test of the porous carbon material is preferably 0.4 $cm^3/g$ or more and less than 1.0 $cm^3/g$, more preferably 0.7 $cm^3/g$ or more and less than 1.0 $cm^3/g$. When a porous carbon material having $V_0$ within such a range is used, the silicon component content can be increased, so that the amount of lithium inserted into the composite carbon particles can be increased. The total pore volume $V_0$ is a value calculated by multiplying the cumulative volume of nitrogen gas adsorbed on the porous carbon material at the maximum $P/P_0$ obtained in the range of 0.985 or more and 1.000 or less in the nitrogen adsorption test by the volume [$cm^3/cm^3$] of nitrogen gas at 0° C., 1 atm, 1 $cm^3$ in the liquid state at 77 K.

The porous carbon material has a BET specific surface area of 800 $m^2/g$ or more. With such a specific surface area, a large amount of the silicon component can be precipitated on the inner and outer surfaces of the pores of the porous carbon material, so that a sufficiently high specific capacity as a negative electrode material can be obtained. From this viewpoint, the specific surface area of the porous carbon material is preferably 1000 $m^2/g$ or more, and more preferably 1500 $m^2/g$ or more.

<3> Silicon Component

The silicon component is not particularly limited as long as it contains silicon, but it is preferably one or more selected from silicon elemental substance and silicon oxide. An example of a silicon oxide is $SiO_x$ ($0 < x \leq 2$). Silicon is considered to be amorphous silicon. Expansion and contraction of amorphous silicon are isotropic during the insertion and reinsertion of lithium, which improves the cycle characteristics. It is known that amorphous silicon has a peak at 460 to 490 $cm^{-1}$ in the Raman spectrum measured by Raman spectroscopy. Examples of other silicon components include silicon carbide (SiC and the like).

<4> Configuration of Composite Carbon Particles

In the composite carbon particles according to an embodiment of the present invention, the silicon component may be adhered to inner wall of pores of the porous carbon material, but preferably the silicon component is adhered to inner wall of pores of the porous carbon material. This is because when the silicon component is adhered to inner wall of the pores, an electron conduction path around the silicon component can be sufficiently secured in the electrode when the lithium-ion secondary battery is formed, and because such a silicon component has a size approximately equal to that of the pores of the porous carbon, there is a low possibility that the silicon component is cracked in association with insertion and reinsertion of lithium.

Further, SEM-EDX measurement of the cross-section of the composite carbon particles can confirm whether the silicon component is adhered to the inner wall of pores of the porous carbon material or whether the silicon component is precipitated inner wall of pores of the porous carbon material.

In the composite carbon particles according to an embodiment of the present invention, the 50% particle size $D_{V50}$ in the volume-based cumulative particle size distribution by the laser diffraction method is preferably 4.0 μm or more. When $D_{V50}$ is 4.0 μm or more, the powder is excellent in handleability, a slurry having a viscosity and a density suitable for coating is easily prepared, and the density of the electrode is easily increased. From this viewpoint, $D_{V50}$ is more preferably 6.0 μm or more, and still more preferably 7.0 μm or more.

In the composite carbon particles according to an embodiment of the present invention, $D_{V50}$ is preferably 30.0 μm or less. When $D_{V50}$ is 30.0 μm or less, the diffusion length of lithium in each particle is short, and thus the rate characteristics of a lithium-ion battery are excellent, and in addition, stripping or abnormal unevenness do not occur when the slurry is applied to a current collector. From this viewpoint, $D_{V50}$ is more preferably 20.0 μm or less, and still more preferably 15.0 μm or less. Further, $D_{V50}$ is preferably 6.0 μm or more, and more preferably 10.0 μm or more.

The 10% particle size $D_{V10}$ is preferably 1.0 μm or more, more preferably 1.5 μm or more, and still more preferably 2.0 μm or more. When $D_{V10}$ is 1.0 μm or more, the composite carbon particles are less likely to aggregate, and stripping or abnormal unevenness do not occur when the slurry is applied to a current collector.

$D_{V50}$ and $D_{V10}$ can be measured by laser diffraction method.

In the composite carbon particles according to an embodiment of the present invention, the BET specific surface area is preferably 40.0 m$^2$/g or less. When the BET specific surface area is 40.0 m$^2$/g or less, the decomposition reaction of the electrolytic solution, which is a side reaction, hardly occurs, and the coulombic efficiency can be increased. From this viewpoint, the BET specific surface area is more preferably 35.0 m$^2$/g or less, and still more preferably 30.0 m$^2$/g or less.

The BET specific surface area is preferably 0.50 m$^2$/g or more. When the BET specific surface area is 0.50 m$^2$/g or more, the insertion and reinsertion of lithium becomes easy, and the cycle characteristics can be improved. From this viewpoint, the BET specific surface area is more preferably 0.8 m$^2$/g or more, and still more preferably 1.5 m$^2$/g or more. The BET specific surface area can be measured by the method described in Examples.

In the composite carbon particles according to an embodiment of the present invention, R value ($I_D/I_G$), which is a ratio of a peak intensity ($I_D$) in the vicinity of 1350 cm$^{-1}$ to a peak intensity ($I_G$) in the vicinity of 1580 cm$^{-1}$ in a Raman spectrum, is preferably 0.80 or more. When R value is 0.80 or more, the reaction resistance is sufficiently low, which leads to an improvement in the coulombic efficiency of the battery. R value is more preferably 0.90 or more, and still more preferably 1.00 or more.

R value is preferably 1.50 or less. The fact that R value is 1.50 or less means that there are few defects on the surface of the composite carbon particles, and the side reaction is reduced, so that the initial coulombic efficiency is improved. From this viewpoint, R value is more preferably 1.40 or less, and still more preferably 1.20 or less.

In the composite carbon particles according to an embodiment of the present invention, in the XRD pattern measured by powder XRD using a Cu-Kα ray, the full width at half maximum of the peak of the 111 plane of Si is preferably 3.00° or more. When the full width at half maximum is 3.00° or more, the crystallites are small and the amorphous property is high, which leads to suppression of cracking of silicon accompanying charge/discharge, so that the cycle characteristics can be improved. From this viewpoint, the full width at half maximum of the peak of the 111 plane of Si is more preferably 3.40° or more, and still more preferably 4.00° or more.

In the composite carbon particles according to an embodiment of the present invention, in the XRD pattern measured by powder XRD using a Cu-Kα ray, the ratio of the peak intensity of the 111 plane of SiC and the peak intensity of the 111 plane of Si, that is, (peak intensity of 111 plane of SiC)/(peak intensity of 111 plane of Si) is preferably 0.01 or less. Accordingly, since SiC (silicon carbide) is not contained in the composite carbon particles or the content of SiC is extremely low, the utilization rate of silicon as a battery active material is improved, and the initial discharge capacity can be increased. The (peak intensity of 111 plane of SiC)/(peak intensity of 111 plane of Si) is also referred to as $I_{SiC111}/I_{Si111}$. The lower limit of $I_{SiC111}/I_{Si111}$ is 0.00. That is, it is more preferable that the peak of SiC is not observed. Here, the "peak intensity" is the height from the baseline to the peak apex after the baseline is corrected.

In the composite carbon particles according to an embodiment of the present invention, the content of the silicon component is preferably 15% by mass or more. When the content of the silicon component is 15% by mass or more, the composite carbon particles can have a high specific capacity. From this viewpoint, the content of the silicon component is more preferably 20% by mass or more, and still more preferably 43% by mass or more.

The content of the silicon component is preferably 85% by mass or less. When the content of the silicon component is 85% by mass or less, the porous carbon particles serving as the carrier can absorb a volume change due to expansion and contraction thereof. From this viewpoint, the content of the silicon component is more preferably 70% by mass or less, and still more preferably 55% by mass or less. The specific capacity is the amount of electricity exchanged by the active material divided by the mass of the active material. In general, the specific capacity can be determined by dividing the capacity obtained in a half cell by the mass of the active material used.

The content of the silicon component in the composite carbon particles can be determined by a fundamental parameter method (FP method) in an X-ray fluorescence analyzer. In a case where silicon oxide is contained, the contents of these can be determined by using oxygen content measurement in combination. It is also possible to determine the contents by inductively coupled plasma atomic emission spectrometry (ICP-AES) or the like after burning the composite carbon particles to remove carbon and completely dissolving the burnt ash in an acid or alkali.

The composite carbon particles according to the present embodiment preferably have an average circularity of 0.95 or more and 1.00 or less. Here, the circularity of the particle refers to the ratio (the area of projected image of the particle multiplied by 4π) to (the square of the circumference of projected image of the particle). In the present embodiment, the average circularity of the composite carbon particles is obtained by averaging the circularities of 100 or more composite carbon particles. The composite carbon particles having an average circularity within the above range are spherical and expand isotropically when lithium is intercalated, so that damage to the electrode can be reduced.

<5> Method for Producing Composite Carbon Particles

A method for producing the composite carbon particles according to an embodiment of the present invention includes, for example, the following steps (1) and (2).

Step (1): step of preparing porous carbon material

Step (2): step of allowing a silicon-containing gas such as a silane gas to act on the heated porous carbon to precipitate a silicon component on a surface and in pores of the porous carbon to obtain composite carbon particles containing the porous carbon material and the silicon component.

(Step (1))

The method for producing the porous carbon material is to thermally decompose a carbon precursor such as a specific resin or organic substance under specific conditions. For example, resins or organic substances are synthesized and the conditions for thermally decomposing the resins or organic substances are adjusted while examining changes in $V_0$, $V_1$, $V_2$, $V_3$, and BET specific surface area, or carbonaceous materials such as carbon black are subjected to oxidation treatment, activation treatment, or the like so as to have the above-described characteristics. As the carbon precursor, those described in Patent Literature 2 can be freely used, but a phenolic resin and a copolymer of resorcinol and formaldehyde are preferable. Prior to carbonization, the resin may be cured by heat treatment at 150° C. to 300° C. for 1 to 6 hours. Further, after curing, the resin may be crushed to have a particle size of about 0.5 to 5.0 mm.

Preferably, the resin can be produced by carbonization by holding the resin at a temperature of 400° C. to 1100° C. for 1 to 20 hours in an inert atmosphere. During the carbonization, although depending on the type of the carbon precursor to be used, it is desirable that 10 to 1000 ppm by volume of water vapor is entrained in the inert gas.

The obtained carbide is subjected to a nitrogen adsorption test, and in a case where the values of pore distribution and BET specific surface area are not desirable, the activation treatment is performed as necessary. The carbide is heated to 800° C. to 1100° C. under an inert atmosphere, then switched to $CO_2$ gas, and held at that temperature for 1 to 20 hours. By this treatment, pores are further developed in the carbide.

In order to examine the pore distribution and the BET specific surface area of the obtained activated material and to adjust these, a heat treatment may also be further performed in an inert gas such as Ar. The temperature is 1000° C. to 2000° C. and the temperature is maintained for 1 to 20 hours. By this treatment, the pores are reduced, and a porous carbon material having a desired $V_0$, $V_1$, $V_2$, $V_3$, and BET specific surface area can be obtained.

(Step (2))

Step (2) is a CVD step in which a silicon-containing gas, preferably a silane gas, is allowed to act on the heated porous carbon material to precipitate a silicon component in pores of the porous carbon material to obtain the composite carbon particles. At this time, thermal decomposition of the silicon-containing gas occurs in the pores of the porous carbon material.

For example, when the porous carbon material is placed in a chamber of a CVD apparatus and a silane gas is allowed to act on the porous carbon material in a heated state, silane enters the inside the pores of the porous carbon material and is further thermally decomposed, whereby silicon can be precipitated in the pores of the porous carbon material. As a method therefor, for example, an apparatus and a method disclosed in Patent Literature 1 can be used.

Silane decomposition also occurs on the surface of the porous carbon material, and silicon precipitates. In general, since the surface area of the pores of the porous carbon material is much larger than the external area, the amount of silicon precipitated in the pores of the porous carbon material is overwhelmingly large, but when the supported amount of silicon is increased or the treatment is performed at a higher temperature, the precipitation on the surface of the porous carbon material may become remarkable.

Examples of the silicon-containing gas used include disilane, trisilane, in addition to the silanes listed above. Further, the silicon-containing gas may contain other gases, for example, a carrier gas such as nitrogen gas, argon gas, helium gas, or hydrogen gas. Various conditions of CVD, such as gas composition ratio, gas flow rate, temperature program, and fixed bed/fluidized bed selection, can be adjusted as appropriate while observing the nature of the product.

Alternatively, after the silicon component is precipitated in the pores of the porous carbon to obtain the composite carbon particles, the composite carbon particles may be brought into contact with an inert gas atmosphere containing oxygen to oxidize the surface of the silicon component. Since pure silicon has high activity, rapid deterioration of the composite carbon particles can be suppressed by oxidizing the surface. The amount of oxygen required for such oxidation of the surfaces of the silicon components is preferably about 0.01 to 0.18 moles per mole of Si in the composite carbon particles.

In order to obtain the composite carbon particles according to the present embodiment having an average circularity of 0.95 or more and 1.00 or less described above, the step (2) may be performed using a spherical porous carbon material having an average circularity of 0.95 or more and 1.00 or less. This is because Si is precipitated in the pores of the porous carbon material in the step (2), and thus the shape of the particles hardly changes before and after the step (2). However, since weak aggregation may occur after the step (2), aggregated particles or coarse particles may be removed by crushing or sieving to such an extent that the aggregation is eliminated. In that case, it is desirable to avoid pulverizing with excessive force and destroying many particles.

The porous carbon material having an average circularity of 0.95 or more and 1.00 or less may be selected from porous carbon materials meeting the conditions described above, or may be obtained by forming a porous body by subjecting a spherical carbonaceous material having an average circularity of 0.95 or more and 1.00 or less to an activation treatment. Alternatively, a spherical resin having an average circularity of 0.95 or more and 1.00 or less may be synthesized and subjected to carbonization or activation treatment. The spherical resin having an average circularity of 0.95 or more and 1.00 or less can also be obtained by synthesizing a spherical resin by suspension polymerization or emulsion polymerization. In a case where aggregation occurs in the steps, aggregated particles or coarse particles may be removed by crushing or sieving to such an extent that the aggregation is eliminated. In that case, it is desirable to avoid pulverizing with excessive force and destroying many particles.

After the Si precipitation or oxidation, a separate coating layer may be formed on the surface of the composite carbon particles. Specific examples thereof include carbon coating, inorganic oxide coating, and polymer coating. Examples of the techniques of the carbon coating include chemical vapor deposition (CVD) and physical vapor deposition (PVD). Examples of the techniques of the inorganic oxide coating include CVD, PVD, atomic layer deposition (ALD) and wet methods. The wet method includes a method of coating composite carbon particles with a liquid obtained by dissolving or dispersing a precursor of an inorganic oxide (metal carboxylate or alkoxide) in a solvent, and removing the solvent by heat treatment or the like. As the type of polymer coating, a method of coating using a polymer solution, a method of coating using a polymer precursor containing a monomer and polymerizing by applying temperature, light, or the like, or a combination thereof may be used.

The inorganic oxide is preferably one or more selected from the group consisting of oxides of Al, Ti, V, Cr, Mn, Fe, Co, Ni, Y, Zr, Mo, Nb, La, Ce, Ta, and W and Li-containing oxides.

The coating layer may be a single layer or a combination of a plurality of layers. In order to prevent silicon in the composite carbon particles from reacting with carbon to form silicon carbide as a by-product, it is preferable to treat at a temperature of less than 800° C. when the coating is applied.

The coating layer provided on the surface of the composite carbon particles can be examined by analyzing the particle surface. Examples thereof include SEM-EDS, Auger electron spectroscopy, X-ray photoelectron spectroscopy (XPS), micro-infrared spectroscopy, and micro-Raman spectroscopy.

Examples of the effects of coating include (1) suppression of oxidation over time of the silicon component inside the composite carbon particles, (2) increase in initial coulombic efficiency in a lithium-ion secondary battery, and (3) improvement in cycle characteristics in the battery, as described below.

(1) Suppression of Oxidation Over Time of Silicon Component Inside Composite Carbon Particles When the composite carbon particles are exposed to air or an oxygen-containing atmosphere, the silicon component is oxidized with the lapse of time. The presence of the coating layer on the surface of the composite carbon particles can suppress air or an oxygen-containing gas from entering the inside of the composite carbon particles.

(2) Increase in Initial Coulombic Efficiency in Lithium-Ion Secondary Battery

When an electrolytic solution decomposition product film (solid electrolyte interface <SEI> film) is formed on the surface of the composite carbon particles or a lithium-ion entry port into the composite carbon particles after lithium-ions are first inserted into the composite carbon particles in the lithium-ion battery, lithium-ions that cannot be deinserted from the closed pores in the composite carbon particles are present, and thus the initial coulombic efficiency is reduced. Since the SEI film is present at the time of the second and subsequent lithium-ion insertions, the ratio of lithium-ions trapped in the composite carbon particles is greatly reduced. Here, the presence of the coating layer on the surface of the composite carbon particles prevents the insertion of lithium-ions into the pores that are easily closed by the SEI film, thereby increasing the initial coulombic efficiency.

(3) Improvement of Cycle Characteristics in Lithium-Ion Secondary Battery

It is considered that when charging and discharging are repeated in a lithium-ion battery, the silicon component in the composite carbon particles reacts with fluorine which is a component element of the electrolytic solution, and is eluted as a silicon fluoride compound. When the silicon component is eluted, the specific capacity of the composite carbon particles decreases. When the coating layer is present on the surface of the composite carbon particles, the elution of the silicon component is suppressed, and thus the capacity decrease of the composite is suppressed, and thus the cycle characteristics are improved.

The average aspect ratio and average circularity of the composite carbon particles can be adjusted by adjusting the shape of the porous carbon particles to be used to a predetermined range, and can also be adjusted to the desired particle size and particle size distribution by appropriately performing a classification operation.

After removing the silicon component from the inside of the pores and the surface of the composite carbon particles in the present embodiment, the evaluation of the porous carbon material can be carried out. Specific examples of the method for removing silicon components include a method in which the composite carbon particles are dispersed in an alkaline aqueous solution such as a 0.5 mol/L KOH-aqueous solution, stirred at a high temperature of about 50° C. for 1 to 5 days, evacuated every other day, and the treated solid is filtered and washed.

In one of the present embodiments, the composite carbon particles contain inorganic particles and a polymer are present on a portion or the entire surface thereof. Such forms are sometimes referred to herein as "polymer-coated composite carbon particles".

<6> Inorganic Particles

Examples of the inorganic particles include metal oxides such as titanium oxide, niobium oxide, yttrium oxide, and aluminum oxide; lithium-containing oxides such as lithium titanate; and conductive particles containing carbon as a main component such as graphite, hard carbon, soft carbon, and carbon black.

Two or more of these can be selected and used.

The inorganic particles may be present on the surface of the composite carbon particles, the presence or absence of which can be confirmed by the adhesion of protrusions when observed by scanning electron microscope (SEM).

The content of the inorganic particles is preferably 1.0% by mass to 10.0% by mass, more preferably 2.0% by mass to 9.0% by mass, still more preferably 3.0% by mass to 8.0% by mass of the entire composite carbon particles from the viewpoint of improving the cycle characteristics.

The particle size of the inorganic particles is preferably smaller than that of the polymer-coated composite carbon particles, and more preferably ½ or less. This is because the inorganic particles are likely to be present on the surface of the composite carbon particles.

By including the inorganic particles, the electrical conductivity of the composite carbon particles can be increased. Conductive particles are preferably contained as the inorganic particles, and although specific examples of the conductive particles are not particularly limited, at least one selected from the group consisting of granular graphite and carbon black is preferable, and granular graphite is preferable from the viewpoint of improving cycle characteristics. Examples of granular graphite include particles such as artificial graphite, natural graphite, and mesophase carbon (MC). Examples of carbon black include acetylene black, ketjen black, thermal black, furnace black, and acetylene black is preferable from the viewpoint of conductivity.

The granular graphite preferably has high crystallinity from the viewpoint of improving both the initial charge specific capacity and coulombic efficiency. Specifically, the value of the average interplanar spacing ($d_{002}$) obtained by measuring the granular graphite based on the Gakushin method is preferably 0.335 nm to 0.347 nm, more preferably 0.335 nm to 0.345 nm, still more preferably 0.335 nm to 0.340 nm, and particularly preferably 0.335 nm to 0.337 nm. When the average interplanar spacing of the granular graphite is 0.347 nm or less, the crystallinity of the granular graphite is high, and both the battery capacity and the charge/discharge efficiency tend to be improved. On the other hand, since the theoretical value of the graphite crystal is 0.335 nm, when the average interplanar spacing of the granular graphite is close to this value, both the battery capacity and the charge/discharge efficiency tend to be improved.

The shape of the granular graphite is not particularly limited, and may be flat graphite or spherical graphite. From the viewpoint of improving cycle characteristics, flat graphite is preferable.

In the present disclosure, the flat graphite means graphite having an aspect ratio other than 1, that is, graphite having a short axis and a long axis. Examples of the flat graphite include graphite having a shape of a scale, a flake, a lump.

The aspect ratio of the conductive particle is not particularly limited, but the average aspect ratio is preferably 3.3 or more, and more preferably 5.0 or more, from the viewpoint of easily ensuring conduction between the conductive particles and improving the cycle characteristics. The average aspect ratio of the conductive particles is preferably 1000 or less, more preferably 100 or less.

The aspect ratio of the conductive particles is the same as that for the composite carbon particles.

The conductive particles may be either primary particles (single particles) or secondary particles (granulated particles) formed from a plurality of primary particles. Further, the flat graphite may be porous graphite particles.

<7> Polymer

The composite carbon particles contain a polymer on a portion or all of the surface of the composite carbon particles. It is considered that by containing the polymer, the specific surface area of the composite carbon particles is reduced and the reaction with the electrolytic solution is suppressed, so that the recovery rate after charge/discharge is improved.

The content of the polymer is preferably 0.1% by mass to 10.0% by mass in the entire composite carbon particles. Within the above range, the effect of improving the recovery rate after charging/discharging tends to be sufficiently obtained while suppressing the decrease in conductivity. The content of the polymer in the entire composite carbon particles is preferably 0.2% by mass to 7% by mass, more preferably 0.2% by mass to 5.0% by mass.

The content of the polymer in the entire composite carbon particles can be confirmed by, for example, heating sufficiently dried composite carbon particles to a temperature (for example, 300° C.) equal to or higher than a temperature at which the polymer decomposes and lower than a temperature at which the composite carbon particles and the inorganic particles decompose, and measuring the mass of the composite carbon particles after the polymer decomposes. Specifically, in a case where the mass of the composite carbon particles before heating is A g and the mass of the composite carbon particles after heating is B g, (A-B) is the content of the polymer. The content of the polymer can be calculated as [(A−B)/B]×100.

The above measurement can also be carried out by using thermogravimetry (TG). This is preferable because the amount of sample required for measurement is small and measurement can be performed with high accuracy.

The type of polymer is not particularly limited. Examples thereof include at least one selected from the group consisting of polysaccharides, cellulose derivatives, animal water-soluble polymers, lignin derivatives, and water-soluble synthetic polymers.

Specific examples of the polysaccharide include starch derivatives such as starch acetate, starch phosphate, carboxymethyl starch, and hydroxyalkyl starches such as hydroxyethyl starch, dextrin, dextrin derivatives, cyclodextrin, alginic acid, alginic acid derivatives, sodium alginate, agarose, carrageenan, xyloglucan, glycogen, tamarind seed gum, pullulan, and pectin.

Examples of the cellulose derivative include carboxymethyl cellulose, methyl cellulose, hydroxyethyl cellulose, and hydroxypropyl cellulose.

Examples of the animal water-soluble polymer include casein and gelatin. Examples of the water-soluble synthetic polymer include water-soluble acrylic polymers, water-soluble epoxy polymers, water-soluble polyesters, water-soluble polyamides, and water-soluble polyethers, and more specific examples thereof include polyvinyl alcohol, polyacrylic acid, polyacrylate, polyvinyl sulfonic acid, polyvinyl sulfonate, poly(4-vinylphenol), poly(4-vinylphenol) salt, polystyrene sulfonic acid, polystyrene sulfonate, polyaniline sulfonic acid, polyacrylamide, polyvinylpyrrolidone, and polyethylene glycol. The polymer may be used in the form of a metal salt, an alkylene glycol ester, or the like.

In the present embodiment, the polymer preferably contains one or more selected from the group consisting of polysaccharides, cellulose derivatives, gelatin, casein, and water-soluble polyethers as the first component, and one or more selected from the group consisting of monosaccharides, disaccharides, oligosaccharides, amino acids, gallic acid, tannin, saccharin, saccharin salts and butynediol as the second component. In the present embodiment, the polysaccharide means a compound having a structure in which 10 or more monosaccharide molecules are bonded, and the oligosaccharide means a compound having a structure in which 3 to 10 monosaccharide molecules are bonded.

Specific examples of the polysaccharide include the polysaccharides described above.

Specific examples of the cellulose derivative include the cellulose derivatives described above.

Specific examples of the water-soluble polyether include polyalkylene glycols such as polyethylene glycol.

Specific examples of the monosaccharide include arabinose, glucose, mannose, and galactose.

Specific examples of the disaccharide include sucrose, maltose, lactose, cellobiose, and trehalose.

Specific examples of the oligosaccharide include raffinose, stachyose, and maltotriose.

Specific examples of the amino acid include glycine, alanine, valine, leucine, isoleucine, serine, threonine, cysteine, cystine, methionine, aspartic acid, glutamic acid, lysine, arginine, phenylalanine, tyrosine, histidine, tryptophan, proline, oxyproline, and glycylglycine.

Specific examples of the tannin include tea catechin and persimmon catechin.

The first component preferably contains at least one polysaccharide, more preferably at least one selected from the group consisting of starch, dextrin, and pullulan. It is considered that the first component is present to cover a portion or all of the surface of the composite carbon particles, thereby reducing their specific surface area. As a result, the reaction between the composite carbon particles and the electrolytic solution is suppressed, and the cycle performance can be improved.

The second component preferably contains at least one selected from the group consisting of disaccharides and monosaccharides, and more preferably contains at least one selected from the group consisting of maltose, lactose, trehalose, and glucose. It is considered that the second component is incorporated into the first component and suppresses the solubility of the precipitate film formed from the first component in water or the electrolytic solution. By using the second component in combination, the surface of the composite carbon particles can be strongly coated, and the binding force of the inorganic particles can also be improved. Therefore, the cycle performance can be improved. From the same viewpoint, in a case where the polymer contains the first component and the second component, the mass ratio thereof (first component:second component) is preferably 1:1 to 25:1, more preferably 3:1 to 20:1, and still more preferably 5:1 to 15:1.

The method of allowing the polymer to be present on a portion or all of the surface of the composite carbon particles is not particularly limited. For example, the inorganic particles may be dispersed in a liquid in which the polymer is dissolved or dispersed, the composite carbon particles are added thereto, followed by stirring as necessary, so that the polymer adheres to the composite carbon particles. Thereafter, the composite carbon particles to which the polymer is adhered are taken out of the liquid and dried as necessary, thereby enabling to obtain the composite carbon particles to which the polymer is adhered to inner wall of pores.

The temperature of the solution during stirring is not particularly limited, and can be selected from, for example, 5° C. to 95° C. In a case where the solution is heated, the concentration of the solution may change due to distillation of the solvent used in the solution. To avoid this, it is necessary to prepare the solution in a closed vessel or to reflux the solvent. When the polymer is allowed to be uniformly present on a portion or all of the surface of the composite carbon particles, the treatment may be performed while distilling off the solvent. The stirring atmosphere is not particularly limited as long as the performance of the composite carbon particles is not impaired.

The temperature during drying is not particularly limited as long as the polymer is not decomposed and distilled off, and can be selected from, for example, 50° C. to 200° C. Drying in an inert atmosphere or under vacuum may be carried out.

The content of the polymer in the solution is not particularly limited and can be selected from, for example, 0.1% by mass to 20% by mass.

The solvent used for the solution can be any solvent capable of dissolving and dispersing the polymer and the precursor of the polymer. Examples thereof include those used as solvents such as water, alcohols such as acetonitrile, methanol, ethanol, and 2-propanol, ketones such as acetone and methyl ethyl ketone, and esters such as ethyl acetate and n-butyl acetate, and two or more thereof may be mixed and used. If necessary, an acid or a base may be added to adjust the pH of the solution.

<8> Electrode Material for Lithium-Ion Secondary Battery

The composite carbon particles of an embodiment of the present invention can be used as an electrode material for a lithium-ion secondary battery. For example, it is also possible to use composite carbon particles as a negative electrode material. As used herein, the "negative electrode material" refers to a negative electrode active material or a composite of a negative electrode active material and another material. The composite carbon particles may be used alone or in combination with other negative electrode materials. As the other negative electrode materials, those generally used in lithium-ion secondary battery can be used. In a case where other negative electrode materials are used, composite carbon particles and other negative electrode materials are usually mixed and used.

Examples of other negative electrode materials include graphite, hard carbon, lithium titanate ($Li_4Ti_5O_{12}$), alloy-based active materials such as silicon and tin, and composite materials thereof. These negative electrode materials are usually in the form of particles. The negative electrode material other than the composite carbon particles may be used alone or in combination of two or more kinds thereof. Among them, graphite and hard carbon are particularly preferably used. In one preferred embodiment, the negative electrode material of the present invention contains composite carbon particles and graphite particles.

<9> Negative Electrode Mixture Layer

A negative electrode mixture layer according to the present invention contains the negative electrode material. The negative electrode mixture layer of an embodiment of the present invention can be used as a negative electrode mixture layer for a lithium-ion secondary battery. The negative electrode mixture layer generally contains a negative electrode material, a binder, and a conductive auxiliary agent as an optional component.

A method for producing the negative electrode mixture layer may be, for example, a known method as described below. A negative electrode material, a binder, a conductive auxiliary agent as an optional component, and a solvent are used to prepare a slurry for forming a negative electrode mixture layer. The slurry is applied to a current collector such as copper foil and dried. This is further vacuum-dried, roll-pressed, and then cut or punched out into a desired shape and size. The pressure in the roll-pressing is usually 100 to 500 MPa. The obtained sheet may be referred to as a negative electrode sheet. The negative electrode sheet is obtained by pressing and contains a negative electrode mixture layer and a current collector.

Any binder generally used in the negative electrode mixture layer of a lithium-ion secondary battery can be freely selected and used as the binder. Examples thereof include polyethylene, polypropylene, ethylene-propylene terpolymer, butadiene rubber, styrene-butadiene rubber, butyl rubber, acrylic rubber, polyvinylidene fluoride, polytetrafluoroethylene, polyethylene oxide, polyepichlorohydrin, polyphosphazene, polyacrylonitrile, carboxymethyl cellulose and salts thereof, polyacrylic acid, and polyacrylamide. The binder may be used alone or in combination of two or more kinds thereof. The amount of the binder is preferably 0.5 to 30 parts by mass based on 100 parts by mass of the negative electrode material.

The conductive auxiliary agent is not particularly limited as long as the conductive auxiliary agent plays a role in imparting conductivity and dimensional stability (buffering action on a volume change through insertion and deinsertion of lithium) to the electrode. Examples thereof include carbon nanotubes, carbon nanofibers, vapor grown carbon fibers (for example, "VGCF®-H" manufactured by Showa Denko K.K.), conductive carbon black (for example, "DENKA BLACK®" manufactured by Denka Company Limited, "Super C65" manufactured by Imerys Graphite & Carbon, "Super C45" manufactured by Imerys Graphite & Carbon), and conductive graphite (for example, "KS6L" manufactured by Imerys Graphite & Carbon and "SFG6L" manufactured by Imerys Graphite & Carbon). Further, two or more of the conductive auxiliary agents can be used. The amount of the conductive auxiliary agent is preferably 1 to 30 parts by mass based on 100 parts by mass of the negative electrode material.

In the present embodiment, carbon nanotubes, carbon nanofibers, and vapor grown carbon fibers are preferably contained, and the fiber length of these conductive auxiliary agent is preferably ½ or more of the length of $D_{v50}$ of the composite particles. With this length, these conductive auxiliary agent bridges between the negative electrode active materials containing the composite carbon particles, and the cycle characteristics can be improved. Single-walled or multi-walled carbon nanotubes or carbon nanofibers having a fiber diameter of 15 nm or less are preferable because the number of bridges is further increased with the same amount of carbon nanotubes or carbon nanofibers added as compared with those having a larger fiber diameter. Since these are more flexible, these are more preferable from the viewpoint of improving the electrode density.

The solvent for preparing the slurry for electrode coating is not particularly limited, and examples thereof include N-methyl-2-pyrrolidone, dimethylformamide, isopropanol, and water. In the case of a binder using water as a solvent, a thickening agent is preferably used in combination. The amount of the solvent is adjusted so that the slurry achieves such viscosity that the slurry is easily applied onto a current collector.

<10> Lithium-Ion Secondary Battery

A lithium-ion secondary battery according to the present invention contains the negative electrode mixture layer. The lithium-ion secondary battery usually contains a negative electrode containing the negative electrode mixture layer and a current collector, a positive electrode containing a positive electrode mixture layer and a current collector, at least one of a nonaqueous electrolytic solution and a nonaqueous polymer electrolyte present therebetween, a separator, and a battery case accommodating these components. As long as the lithium-ion secondary battery includes the negative electrode mixture layer, other configurations including conventionally known configurations can be employed without particular limitation.

The positive electrode mixture layer usually contains a positive electrode material, a conductive auxiliary agent, and a binder. The positive electrode in the lithium-ion secondary battery may have a general configuration in a typical lithium-ion secondary battery.

The positive electrode material is not particularly limited as long as electrochemical lithium insertion and reinsertion can be repeated and the oxidation-reduction potential of these reactions is sufficiently higher than the oxidation-reduction potential of the negative electrode reaction. For example, $LiCOO_2$, $LiNiO_2$, $LiMn_2O_4$, $LiCo_{1/3}Mn_{1/3}Ni_{1/3}O_2$, carbon-coated $LiFePO_4$, or a mixture thereof can be suitably used. As used herein, the "positive electrode material" refers to a positive electrode active material or a composite of a positive electrode active material and another material.

As the conductive auxiliary agent, the binder, and the solvent for preparing the slurry, those described in the section of the negative electrode can be used. Aluminum foil is preferably used as the current collector.

There is no particular limitation on the nonaqueous electrolytic solution and nonaqueous polymer electrolyte used in the lithium-ion batteries. Examples of the nonaqueous electrolytic solution include an organic electrolytic solution in which a lithium salt such as $LiClO_4$, $LiPFE_6$, $LiASF_6$, $LiBF_4$, $LiSO_3CF_3$, $CH_3SO_3Li$, is dissolved in a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, γ-butyrolactone.

Examples of the nonaqueous polymer electrolyte include a gel polymer electrolyte containing such as polyethylene oxide, polyacrylonitrile, polyvinylidene fluoride, polymethyl methacrylate; and a solid polymer electrolyte containing such as a polymer having an ethylene oxide bond.

Further, a small amount of the additive used in the electrolytic solution of a general lithium-ion battery may be added to the nonaqueous electrolytic solution. Examples of the substance include vinylene carbonate (VC), biphenyl, propanesultone (PS), fluoroethylene carbonate (FEC), and ethylene sultone (ES). VC and FEC are preferred. The amount to be added is preferably 0.01 to 20% by mass based on 100% by mass of the nonaqueous electrolytic solution.

The separator can be freely selected from materials that can be used in general lithium-ion secondary batteries, including combinations thereof, and examples thereof include microporous films made of polyethylene or polypropylene. In addition, it is also possible to use separators obtained by mixing particles such as $SiO_2$ or $Al_2O_3$ as fillers into such separators, or separators obtained by adhering the particles to the surfaces of such separators.

The battery case is not particularly limited as long as it can accommodate the positive electrode, the negative electrode, the separator, and the electrolytic solution. In addition to commercially available battery packs, 18650 cylindrical cell, coin-shaped cells, or the like, which have been standardized in the industry, aluminum packages, and the like can be freely designed and used.

The electrodes may be stacked and packed for use. The single cells can be connected in series and used as batteries or modules.

The lithium-ion secondary battery according to the present invention can be used as a power source for electronic devices such as smartphones, tablet PCs, and mobile information terminals; a power source for electric motors such as electric tools, vacuum cleaners, electric bicycles, drones, and electric vehicles; and storage of electric power obtained by, for example, fuel cells, solar power generation, wind power generation.

EXAMPLES

Hereinafter, Examples of the present invention will be specifically described below. It should be noted that these are merely illustrative examples and do not limit the present invention.

Methods for evaluating composite carbon particles, methods for producing batteries, methods for measuring characteristics of batteries, and raw materials used in Examples and Comparative Examples are as follows.

(1) Evaluation of Composite Carbon Particles

[Confirmation of Average Aspect Ratio and Presence or Absence of Conductive Particles]

The composite carbon particles were supported on a conductive paste or a carbon tape, and the powder shape was observed under the following conditions.

Scanning electron microscope apparatus: Regulus® 8200 (manufactured by Hitachi High-Tech Corporation)

Acceleration voltage: 1 to 10 kV

Observation magnification: 1,000 to 30,000 times

The obtained electron microscope image was subjected to elliptical approximation of the particle using image analysis software (ImageJ), and the ratio of the major axis a to the minor axis b was defined as the aspect ratio. The number of measurement points was 100, and the arithmetic mean value was calculated as the average aspect ratio.

The SEM image of the composite carbon particles free from the conductive particles was compared with the SEM image of the composite carbon particles containing the conductive particles, and the presence or absence of the conductive particles was determined by the presence or absence of a protrusion structure on the surface of the composite carbon particles, which is not seen in the former.

[$I_{Si}/I_G$, R value ($I_D/I_G$)]

Measurements were performed using NRS-5100 of JASCO Corporation as a micro-laser Raman spectrometer at an excitation wavelength of 532.36 nm.

The ratio of the peak intensity ($I_{Si}$) at 460 to 495 cm$^{-1}$ and the peak intensity ($I_G$) in the vicinity of 1580 cm$^{-1}$ in the Raman spectrum was defined as ($I_{Si}/I_G$).

Measurement was performed at 30 points at random, and the average value of the obtained values was defined as $I_{Si}/I_G$.

The ratio of the peak intensity ($I_D$) in the vicinity of 1350 cm$^{-1}$ and the peak intensity ($I_G$) in the vicinity of 1580 cm$^{-1}$ in a Raman spectrum was defined as R value ($I_D/I_G$).

Measurement was performed at 30 points at random, and the average value of the obtained values was defined as R value ($I_D/I_G$).

[Scanning Electron Microscope (SEM) Observation]

The composite carbon particles were supported on a conductive paste or a carbon tape, and a cross section of the powder was polished with CROSS SECTION POLISHER® (manufactured by JEOL Ltd.). The measurement was performed under the following conditions.

Scanning electron microscope apparatus: Regulus® 8200 (manufactured by Hitachi High-Tech Corporation)
Acceleration voltage: 1 to 10 kV
Observation magnification: 500 to 200,000 times Regarding the particle cross-section, Regulus® 8200 series (SU8220) manufactured by Hitachi High-Tech Corporation was used for SEM observation, and XFlash® 6160 manufactured by Bruker was used for EDX. The method of calculating the aspect ratio by SEM is as described above, and the presence or absence of a spot of each element by EDX (presence state of each element) was determined from an EDX spectrum obtained by performing EDX measurement for 1 to 5 minutes at an acceleration voltage of 1 to 10 kV. The cross-section was prepared by solidifying the negative electrode material powder with a polymer and then performing cross-section preparation with a cross-section polisher, and the presence or absence of a silicon component on the surface and in the pores of the composite carbon particles was evaluated.

[10% Particle Size ($D_{V10}$), 50% Particle Size ($D_{V50}$)]

Using LMS-2000e manufactured by Seishin Enterprise Co., Ltd. as a laser diffraction particle size distribution measurement apparatus, 5 mg of a sample was placed in a vessel, 10 g of water containing 0.04% by mass of a surfactant was added thereto, and after performing ultrasonic treatment for 5 minutes, the measurement was carried out, and 10% particle size ($D_{V10}$) and 50% particle size ($D_{V50}$) in the volume-based cumulative particle size distribution of the porous carbon material and the composite carbon particles were determined.

[BET Specific Surface Area]

Using NOVA4200e® manufactured by Quantachrome Instruments as the measuring apparatus, a sample was placed in a sample cell (9 mm×135 mm) so that the total surface area of the sample became approximately 50 m$^2$, dried at 300° C. under vacuum conditions for 1 hour, and then the BET specific surface area was measured. N$_2$ was used as the gas for measurement.

[Nitrogen Adsorption Test]

The nitrogen adsorption test of the porous carbon material used in Examples and Comparative Examples was carried out by BELSORP-max II® manufactured by MicrotracBEL Corp.

Adsorption gas: Nitrogen gas
Pretreatment: Under vacuum, 400° C., 3 hours
Measurement relative pressure (P/P$_0$) lower limit: order 10$^{-8}$
Measurement relative pressure (P/Pc) upper limit: 0.990 or more The total pore volume at the maximum value of the relative pressure P/P$_0$ was defined as V$_0$, wherein P$_0$ is a saturated vapor pressure.

The maximum value of P/P$_0$ was 0.993 to 0.999.

The cumulative pore volume at a relative pressure P/P$_0$=0.1 was defined as V$_2$.

The cumulative pore volume at a relative pressure P/P$_0$=10$^{-7}$ was defined as V$_2$.

The cumulative pore volume at a relative pressure P/P$_0$=10$^{-2}$ was defined as V$_3$.

From these values, V/V$_0$, VW/V$_0$, and V$_3$/V$_0$ were obtained, respectively.

The pore volume distribution was calculated using BEL-Master7® analysis software (manufactured by Microtrac-BEL Corp.). Specifically, the NLDFT method was applied, and the calculation was performed assuming as a carbon material and a slit structure.

[XRD Measurement]

The sample was filled in a glass sample plate (window length×width: 18 mm×20 mm, depth: 0.2 mm), and measurement was performed under the following conditions.

XRD apparatus: SmartLab® manufactured by Rigaku Corporation
X-ray source: Cu-Kα ray
Kβ ray removal method: Ni filter
X-ray output: 45 kV, 200 mA
Measuring range: 10.0 to 80.0°
Scan speed: 10.0°/min The obtained XRD pattern was subjected to background removal and smoothing using analysis software (PDXL2, manufactured by Rigaku Corporation), and then subjected to peak fitting to determine the peak position and intensity. In addition, from the obtained XRD pattern, the full width at half maximum of the peak of the 111 plane of Si, (peak intensity of 111 plane of SiC)/(peak intensity of 111 plane of Si) were determined.

[Silicon Component Content]

The measurement was performed under the following conditions.

X-ray fluorescence apparatus: NEX CG manufactured by Rigaku Corporation
Tube voltage: 50 kV
Tube current: 1.00 mA
Sample cup: Φ32, 12 mL, CH1530
Sample weight: 3 g
Sample height: 11 mm The powder was introduced into the sample cup, and the silicon content was measured by the FP method.

In a case where the active material was silicon oxide, it was converted into the content of silicon oxide.

[Oxygen Content Measurement]

The oxygen content of the particles obtained in Examples and Comparative Examples was measured under the following conditions.

Oxygen/nitrogen/hydrogen analyzer: EMGA-920 manufactured by HORIBA, Ltd.

Carrier gas: Argon

About 20 mg of the particles obtained in Examples and Comparative Examples were weighed in nickel capsules and measured by an oxygen-nitrogen simultaneous analyzer (infrared absorption method after melting in inert gas).

[Polymer Content]

The polymer content of the particles obtained in Examples and Comparative Examples was measured under the following conditions.

Apparatus for TG-DTA: (TG-DTA2000SE manufactured by NETZSCH Japan K.K.)

Sample weight: 10 to 20 mg

Sample pan: Alumina pan

Reference: Alumina pan

Gas atmosphere: Ar

Gas flow rate: 100 mL/min

Temperature increasing rate: 10° C./min

Measurement temperature range: Room temperature to 1000° C.

Weight loss occurs due to decomposition of the polymer at around 300° C. In a case where the mass of the composite (C) before heating is A g and the mass of the composite (C) after heating is B g, (A−B) is the content of the polymer. The content can be calculated as [(A−B)/A]×100.

[Average Circularity]

The composite carbon particles were supported on a conductive paste or a carbon tape, and the powder shape was observed under the following conditions.

Scanning electron microscope apparatus: Regulus® 8200 (manufactured by Hitachi High-Tech Corporation)

Acceleration voltage: 1 to 10 kV

Observation magnification: 1,000 to 30,000 times

The obtained electron microscope image is analyzed by image analysis software (ImageJ), and the circularity is calculated from the following formula.

$$(\text{Circularity}) = 4\pi \times (S/L^2)$$

<Here, S is Particle Area [m$^2$], and L is Particle Perimeter [m].>

The calculation was performed for 100 particles, and the average value was adopted as the average circularity.

[Preparation of Negative Electrode Sheet]

Styrene-butadiene rubber (SBR) and carboxymethyl cellulose (CMC) were used as binders. Specifically, 40% by mass aqueous dispersion of SBR and 2% by mass aqueous solution of CMC were used.

A mixture of carbon black (SUPER C45, manufactured by Imerys Graphite & Carbon) and vapor grown carbon fibers (VGCF®-H, manufactured by Showa Denko K.K.) at a mass ratio of 3:2 was prepared as a mixed conductive auxiliary agent.

A slurry for forming a negative electrode mixture layer was obtained by mixing 90 parts by mass of a negative electrode material produced in Examples and Comparative Examples described later, 5 parts by mass of a mixed conductive auxiliary agent, and 2.5 parts by mass of CMC solid with the CMC aqueous solution and 2.5 parts by mass of SBR solid in the form of SBR aqueous dispersion, adding an appropriate amount of water for viscosity adjustment, and kneading the mixture with a rotation/revolution mixer (manufactured by THINKY CORPORATION).

The slurry for forming a negative electrode mixture layer was uniformly applied to a copper foil having a thickness of 20 μm using a doctor blade so as to have a thickness of 150 vim, dried on a hot plate, and then vacuum-dried to obtain a negative electrode sheet. The dried electrodes were pressed with a uniaxial press at a pressure of 300 MPa to obtain a negative electrode sheet for battery evaluation.

[Preparation of Electrolytic Solution]

The electrolytic solution in the three electrodes laminate half cell and two electrodes laminate full cell described later is obtained by mixing 1% by mass of vinylene carbonate (VC) and 10% by mass of fluoroethylene carbonate (FEC) in a solvent in which ethylene carbonate, ethyl methyl carbonate, and diethyl carbonate are mixed at a volume ratio of 3:5:2, and the electrolyte LiPF$_6$ is further dissolved therein to a concentration of 1 mol/L.

(2) Production of Battery

[Measurement of Electrode Density]

The negative electrode sheet (current collector+negative electrode mixture layer) after pressing was punched out into a circular shape having a diameter of 16 mm, and its mass and thickness were measured. From these values, the mass and thickness of the negative electrode mixture layer were determined by subtracting the mass and thickness of the current collector (circular shape with a diameter of 16 mm) measured separately. In the case of the positive electrode, the electrode density was determined by the same method.

[Production of Three Electrodes Laminate Half Cell]

The negative electrode sheet was punched out to obtain a negative electrode piece for a working electrode having an area of 4.5 cm$^2$ (provided with a Cu-foil tab) and a Li roll was punched out to obtain a Li piece having an area of 7.5 cm$^2$ (3.0 cm×2.5 cm) for a counter electrode and a Li piece having an area of 3.75 cm$^2$ (1.5 cm×2.5 cm) for a reference electrode. A Ni tab having a width of 5 mm was prepared for a counter electrode and a reference electrode, respectively, and a Ni mesh having a size of 5 mm×20 mm was fixed to overlap the 5 mm portion on the tip of the Ni tab. In this case, the 5 mm width of the Ni tab coincides with the 5 mm width of the Ni mesh. The Cu-foil tab of the negative electrode piece was attached to the Ni tab of the working electrode. The Ni mesh at the tip of the Ni tab for the counter electrode was attached to the corner of the Li piece so as to be vertical to the 3.0 cm side of the Li piece for the counter electrode. The Ni mesh at the tip of the Ni tab for the reference electrode was attached to the center of the 1.5 cm side of the Li piece so as to be vertical to the 1.5 cm side of the Li piece for the reference electrode. A microporous polypropylene film was sandwiched between the working electrode and the counter electrode, and the reference electrode was brought into liquid contact nearby the working electrode with the microporous polypropylene film in-between so that short circuit does not occur. In this state, the resultant was sandwiched with two rectangular aluminum laminate packaging materials with the tips of all Ni tabs protruding outward, and the three sides were heat fused together. An electrolytic solution was injected thereinto from an opening. Then, the opening was sealed by heat fusion to prepare a three electrodes laminate half cell for evaluation.

[Preparation of Positive Electrode Sheet]

90 g of LiCoO$_2$, 5 g of carbon black (SUPER C45, manufactured by Imerys Graphite & Carbon) as a conductive auxiliary agent, and 5 g of polyvinylidene fluoride (PVdF) as a binder were weighed, and N-methyl-2-pyrrolidone (NMP) was appropriately added thereto while stirring and mixing to obtain a slurry for positive electrode coating.

The slurry was applied onto an aluminum foil having a thickness of 20 μm using a roll coater and dried to obtain a positive electrode sheet. The obtained sheet for a positive electrode was rolled to a density of 3.6 g/cm³ to obtain a positive electrode sheet.

[Fine Adjustment of Positive/Negative Electrode Capacity Ratio]

When a lithium-ion secondary battery is produced by disposing a positive electrode and a negative electrode so as to face each other, it is necessary to consider the balance between the capacities of both. That is, when the capacity of the negative electrode is too small, metallic lithium is precipitated on the negative electrode after lithium is fully inserted to the limit during battery charging, which causes deterioration of cycle characteristics. On the other hand, when the capacity of the negative electrode is too large, although the cycle characteristics are improved, the battery is charged and discharged under a small load, resulting in a low energy density.

In order to prevent this, the specific capacity of the negative electrode material was measured in advance using a positive electrode sheet having a constant capacity and a coin cell having a lithium counter electrode for the negative electrode sheet, and the thickness of the negative electrode coating slurry during coating was finely adjusted so that the ratio of the capacity $Q_A$ of the negative electrode sheet to the capacity $Q_c$ of the positive electrode sheet was 1.2.

[Preparation of Negative Electrode for Full Cell for Measuring Electrode Expansion and Swelling]

Carboxymethyl cellulose (CMC: CMC1300, manufactured by Daicel Corporation) was used as a binder. Specifically, a 2% by mass aqueous solution in which CMC powder was dissolved was used.

Carbon black, carbon nanotube (CNT), and vapor grown carbon fiber (VGCF®-H, manufactured by Showa Denko K.K.) were prepared as a conductive auxiliary agent, and mixed at 3:1:1 (mass ratio) respectively to obtain a mixed conductive auxiliary agent.

A slurry for a negative electrode was obtained by mixing 90 parts by mass of a mixture of composite carbon particles prepared in Examples and Comparative Examples described later and graphites as a carbon-containing material for adjusting the initial charging specific capacity to 500 mAh/g, 2 parts by mass of a mixed conductive auxiliary agent, and a CMC aqueous solution having an amount of CMC having a solid content of 8 parts by mass, and kneading the mixture with a rotation/revolution mixer (manufactured by THINKY CORPORATION).

The slurry for the negative electrode was applied while finely adjusting the thickness as described in the above section [Fine adjustment of positive/negative electrode capacity ratio] to obtain a negative electrode mixture layer for full cell for measuring electrode expansion and swelling.

The negative electrode sheet having the negative electrode mixture layer with the adjusted thicknesses and the positive electrode sheet were punched out to obtain a negative electrode piece and a positive electrode piece with a 16 mm φ. A polypropylene microporous film (Hipore® NB630B, manufactured by Asahi Kasei Corp.) was sandwiched between the negative electrode piece and the positive electrode piece, and this was placed in a special cell for measuring expansion of electrodes, and an electrolytic solution was injected thereto. After that, the cell was screwed to obtain a full cell for measuring electrode expansion and swelling.

(3) Evaluation of Battery

[Determination of C Rate]

One cell of the three electrodes laminate half cell was subjected to constant current (CC) discharging at a current value equivalent to 0.1 C, and at the time point when 5 mV vs. Li/Li⁺ was reached, the discharge was switched to constant voltage (CV) discharging. The cutoff current was equivalent to 0.005 C. Next, constant current (CC) charging was performed at a current value corresponding to 0.1 C, and the magnitude of the current at 1 C was determined from the charging capacity at this time.

Here, the current value equivalent to 0.1 C is a magnitude of the current that can discharge the capacity of the working electrode estimated from the masses of silicon and graphite in the negative electrode material contained in the working electrode and the theoretical specific capacity (4200 mAh/g and 372 mAh/g, respectively) in 10 hours.

[Charge/Discharge Cycle Test Using Three Electrodes Laminate Half Cell]

The obtained three electrodes laminate half cell was set in a charge/discharge device, and aging was performed for 6 cycles under the following conditions. In the first cycle of the aging, a constant current (CC) discharging was performed at 0.05 C from a rest potential to 0.005 V vs. Li/Li*. A charging was performed at a constant current (CC) of 0.05 C to 1.5 V vs. Li/Li⁺. In the second to sixth cycle of the aging, after performing discharging at a constant current (CC) of 0.2 C to 0.005 V vs. Li/Li⁺, and at the time point when 0.005 V vs. Li/Li⁺ was reached, the discharge was switched to a constant voltage (CV) discharging with a cut-off current of 0.025 C. A charging was performed at a constant current (CC) of 0.2 C to 1.5 V vs. Li/Li⁺.

After performing the aging, a charge/discharge cycle test was performed by the following method.

The discharging was performed at a constant current (CC) of 1 C to 0.005 V vs. Li/Li⁺, the discharging was switched to a constant voltage (CV) discharging with a cut-off current of 0.025 C. A charging was performed at a constant current (CC) of 1 C to 1.5 V vs. Li/Li⁺.

The charging and discharging operations were performed 20 cycles when the charging and discharging operations were defined as 1 cycle, and a low rate test was performed in the 21st cycle in which the charge/discharge rate was changed to 0.1 C. The 21st cycle test was repeated three times and 63 cycles in total were performed as the charge/discharge cycle test.

A charge (Li release) capacity retention rate after the 50th cycle defined by the following equation was calculated.

(Charge (Li release) capacity retention rate after 50th cycle (%))=[(Charge (Li release) capacity in 50th cycle)/(Charge (Li release) capacity in first cycle)]×100

The charge (Li release) capacity in the first cycle in the above equation is the charge (Li release) capacity in first cycle in the charge/discharge cycle test after the aging. The charge (Li release) specific capacity in this first cycle is called the initial charge (Li release) specific capacity, and is defined by the following equation.

Initial charge (Li release) specific capacity=(charge capacity in the first cycle)/(mass of negative electrode material contained in working electrode)

Further, the coulombic efficiency in this first cycle is called the initial coulombic efficiency and is defined by the following equation. Initial coulombic efficiency (%)=100× (charge (Li deinsertion) capacity in first cycle)/(discharge (Li insertion) capacity in first cycle)

[Measurement of Electrode Expansion Rate and Swelling Rate]

Using the full cell for measuring electrode expansion and swelling described above, charging and discharging were performed with ECCS B310 (manufactured by Lasertec Corporation) while observing the cross-section of the cell.

The negative electrode mixture layer thickness immediately after pressing, the negative electrode mixture layer thickness after full charge during aging, the negative electrode mixture layer thickness after full discharge during aging, the negative electrode mixture layer thickness after full charge in the first cycle, the negative electrode mixture layer thickness after full discharge in the first cycle, the negative electrode mixture layer thickness after full discharge in the ninth cycle, the negative electrode mixture layer thickness after full charge in the tenth cycle, and the negative electrode mixture layer thickness after full discharge in the tenth cycle were measured and averaged. Using the average values, the expansion rate and the swelling rate in each state of the negative electrode mixture layer as shown in Table 1 were calculated.

Here, the expansion rate and the swelling rate in the state (B) is reached after the state (A) are calculated based on the following equations. This is also referred to as "expansion rate or swelling rate of state (B) vs. state (A)".

(Expansion rate and swelling rate (%) of state (B) vs. state (A))=100×(thickness of negative electrode mixture layer in state (B)−thickness of negative electrode mixture layer in state (A))/(thickness of negative electrode mixture layer in state (A))

[Charge/Discharge Conditions of Full Cell for Measuring Electrode Expansion and Swelling]

The first cycle was performed as aging under the following conditions. Constant current (CC) charging was performed at 0.05 C to 4.2 V, and then constant current (CC) discharging was performed at 0.05 C to 2.8V.

Next, 10 cycle charge/discharge measurement was performed under the conditions shown below. Constant current (CC) charging was performed at 1 C to 4.2 V, and at the time point when 4.2 V was reached, the charging was switched to constant voltage (CV) charging, and the cutoff current was set to 0.05 C. Subsequently, a constant current (CC) discharging was performed at 1 C to 2.8 V.

Example 1

In a three-necked separable flask equipped with a thermometer, a stirrer, and a Dimroth condenser, 100 parts by mass of a novolac phenolic resin having a weight-average molecular weight in terms of polystyrene of 3000, 100 parts by mass of methyl ethyl ketone, 41 parts by mass of glycidyl methacrylate, and 2 parts by mass of dimethylethanolamine were charged and reacted at 80° C. for 7 hours. The equivalent ratio of the phenolic hydroxyl group equivalent of the novolac phenolic resin to the glycidyl methacrylate is about 100:30. Thereafter, the solvent was removed under reduced pressure to obtain a modified novolac phenolic resin having both a phenolic hydroxyl group and a radically polymerizable hydroxyl group having a weight-average molecular weight in terms of polystyrene of 6000.

The obtained resin was held in an oven at 180° C. for 2 hours to obtain a cured resin. This cured resin was crushed in an agate mortar until the particle size became less than about 2 mm. Next, the crushed product was placed in an alumina boat and heated in a nitrogen gas stream at 600° C. for 2 hours for carbonization. At this time, a gas flow in which 100 volume ppm of water vapor was entrained in nitrogen gas was used. In a ceramic boat, 20 g of the carbide was placed, and the boat was set in a tubular electric furnace. After nitrogen gas was fed at a rate of 500 ml/min to sufficiently replace the atmosphere, the electric furnace was heated to 900° C., switched to a carbon dioxide gas flow at a rate of 500 ml/min, and heated for 2 hours for activation. After that, crushing was performed. As a result, a spherical active carbon (porous carbon) having a BET specific surface area of 1630 m$^2$/g, a total pore volume VD of 0.712 cm$^3$/g, a $D_{V50}$ of 10.0 μm, and an average aspect ratio of 1.15 was obtained.

The spherical active carbon was treated for 6 hours at a set temperature of 400° C., a pressure of 760 torr and a flow rate of 100 sccm in a tube furnace having a silane gas flow of 1.3% by volume mixed with nitrogen gas to obtain silicon-containing composite carbon particles. The average aspect ratio of the composite carbon particles was 1.15. The peak of Si in the Raman spectrum was in the vicinity of 470 cm$^{-1}$, and the value of $I_{Si}/I_G$ was 0.21.

In an agate mortar, 8.5 parts by mass of the obtained composite carbon particles and 91.5 parts by mass of SCMG® (manufactured by SHOWA DENKO K.K.) as graphite particles were mixed to obtain a negative electrode material.

Example 2

A commercially available spherical phenolic resin ($D_{V50}$=7.0 μm) was calcined at 900° C. and carbonated. At this time, a gas flow in which 100 volume ppm of water vapor was entrained in nitrogen gas was used. Thereafter, activation treatment was carried out with $CO_2$ at 1000° C. for 1 hour to obtain spherical active carbon. The adsorption isotherm and pore distribution of the obtained spherical active carbon are shown in FIGS. 2(a) and 2(b). The pore distribution was calculated from the adsorption isotherm by the NLDFT method (assuming as carbon material and slit structure). BELMaster7 (manufactured by MicrotracBEL Corp.) was used as the analysis software. The BET specific surface area of the obtained spherical active carbon was 1810 m$^2$/g, the total pore volume $V_0$ was 0.780 cm$^3$/g, the $D_{V50}$ was 7.0 μm, and the average aspect ratio was 1.01.

The spherical active carbon was exposed to a silane gas flow in the same manner as in Example 1 to obtain silicon-containing composite carbon particles. The SEM photograph of the obtained composite carbon particles is shown in FIG. 1. The average aspect ratio of the composite carbon particles was 1.01. The peak of Si in the Raman spectrum was in the vicinity of 470 cm$^{-1}$, and the value of $I_{Si}/I_G$ was 0.11.

In an agate mortar, 8.5 parts by mass of the obtained composite carbon particles and 91.5 parts by mass of SCMG® (manufactured by SHOWA DENKO K.K.) as graphite particles were mixed to obtain a negative electrode material.

Example 3

Into 800 g of water, 156 g of flake graphite (KS-6, Timcal), 40 g of acetylene black (HS-100, Denka Company Limited) and 4 g of carboxymethyl cellulose were added, and the mixture was dispersed and mixed in a bead mill to obtain a conductive particle dispersion (solid content 25% by mass).

In a batch vessel for a rotation/revolution mixer (manufactured by THINKY CORPORATION), 0.500 g of water and 1.067 g of a 4.5% by mass aqueous solution of pullulan were weighed, and the mixture was rotated and mixed at 1000 rpm for 2 minutes. Then, 2.668 g of the composite carbon particles prepared in Example 2 was added, and the mixture was rotated and mixed at 1000 rpm for 2 minutes. Then, 0.6072 g of the conductive particle dispersion was added, and the mixture was rotated and mixed at 1000 rpm for 2 minutes. Then, 0.111 g of a 4.8% by mass aqueous solution of trehalose was added, and the mixture was rotated and mixed at 1000 rpm for 2 minutes to obtain a mixed slurry. A Teflon® sheet was laid on a hot plate kept warm at 110° C., and the mixed slurry was laid in the form of a Teflon® sheet and dried for 5 hours. The solid matter obtained by drying was crushed in a mortar to obtain Si-containing composite carbon particles.

The average aspect ratio of the composite carbon particles was 1.02. The peak of Si in the Raman spectrum was in the vicinity of 470 cm$^{-1}$, and the value of $I_{Si}/I$; was 0.07.

By SEM observation, protruding portions corresponding to the conductive particles were confirmed on the sample surface. Further, the polymer content was confirmed to be about 2% by mass by TG-DTA measurement.

In an agate mortar, 8.0 parts by mass of the obtained composite carbon particles and 92.0 parts by mass of SCMG® (manufactured by SHOWA DENKO K.K.) as graphite particles were mixed to obtain a negative electrode material.

Example 4

Si-containing composite carbon particles were obtained in the same manner as in Example 3 except that pullulan was replaced with tamarind seed gum and trehalose with sorbitol.

The average aspect ratio of the composite carbon particles was 1.03. The peak of Si in the Raman spectrum was in the vicinity of 470 cm$^{-1}$, and the value of $I_{Si}/I_G$ was 0.06.

By SEM observation, protruding portions corresponding to the conductive particles were confirmed on the sample surface. Further, the polymer content was confirmed to be about 2% by mass by TG-DTA measurement.

In an agate mortar, 8.0 parts by mass of the obtained composite carbon particles and 92.0 parts by mass of SCMG® (manufactured by SHOWA DENKO K.K.) as graphite particles were mixed to obtain a negative electrode material.

Example 5

Si-containing composite carbon particles were obtained in the same manner as in Example 3 except that pullulan was replaced with pectin and trehalose with sorbitol.

The average aspect ratio of the composite carbon particles was 1.03. The peak of Si in the Raman spectrum was in the vicinity of 470 cm$^1$, and the value of $I_{Si}/I_G$ was 0.08.

By SEM observation, protruding portions corresponding to the conductive particles were confirmed on the sample surface. Further, the polymer content was confirmed to be about 2% by mass by TG-DTA measurement.

In an agate mortar, 8.0 parts by mass of the obtained composite carbon particles and 92.0 parts by mass of SCMG® (manufactured by SHOWA DENKO K.K.) as graphite particles were mixed to obtain a negative electrode material.

Example 6

Si-containing composite carbon particles were obtained in the same manner as in Example 2 except that a commercially available spherical phenolic resin ($D_{V50}$=7.0 μm) was replaced with a commercially available spherical phenolic resin ($D_{V50}$=19.0 μm).

The average aspect ratio of the composite carbon particles was 1.01. The peak of Si in the Raman spectrum was in the vicinity of 470 cm$^{-1}$, and the value of $I_{Si}/I_G$ was 0.21.

In an agate mortar, 8.5 parts by mass of the obtained composite carbon particles and 91.5 parts by mass of SCMG® (manufactured by SHOWA DENKO K.K.) as graphite particles were mixed to obtain a negative electrode material.

Comparative Example 1

Silicon-containing composite carbon particles were obtained by subjecting commercially available coconut shell active carbon (KD-PWSP, BET specific surface area: 1360 m$^2$/g, total pore volume $V_0$: 0.626 cm$^3$/g, $D_{V50}$: 5.6 μm, average aspect ratio: 1.78) to a silane gas flow in the same manner as in Example 1. The average aspect ratio of the composite carbon particles was 1.78. The peak of Si in the Raman spectrum was in the vicinity of 470 cm$^{-1}$, and the value of $I_{Si}/I_G$ was 0.01.

In an agate mortar, 10.0 parts by mass of the obtained composite carbon particles and 90.0 parts by mass of SCMG® (manufactured by SHOWA DENKO K.K.) as graphite particles were mixed to obtain a negative electrode material.

Comparative Example 2

Silicon-containing composite carbon particles were obtained by subjecting active carbon (commercially available product, BET specific surface area: 3660 m/g, total pore volume $V_0$: 1.920 cm$^3$/g, $D_{v50}$: 9.6 μm, average aspect ratio: 1.52) to a silane gas flow in the same manner as in Example 1. The adsorption isotherm and pore volume distribution of the active carbon used are shown in FIGS. 2(a) and 2(b). Further, the average aspect ratio of the composite carbon particles was 1.52. The peak of Si in the Raman spectrum was in the vicinity of 470 cm$^{-1}$, and the value of $I_{Si}/I_G$ was 0.08.

In an agate mortar, 4.5 parts by mass of the obtained composite carbon particles and 95.5 parts by mass of SCMG® (manufactured by SHOWA DENKO K.K.) as graphite particles were mixed to obtain a negative electrode material.

Comparative Example 3

A commercially available spherical phenolic resin ($D_{V50}$=7.0 μm) was calcined at 900° C. and carbonated. At this time, a gas flow in which 100 volume ppm of water vapor was entrained in nitrogen gas was used. Thereafter, activation treatment was carried out with $CO_2$ at 950° C. for 5 hours to obtain spherical active carbon (BET specific surface area: 2183 m$^2$/g, total pore volume $V_0$: 1.030 cm$^3$/g, $D_{V50}$: 6.5 μm, average aspect ratio: 1.09). The spherical active carbon was exposed to a silane gas flow in the same manner as in Example 1 to obtain silicon-containing composite carbon particles. The average aspect ratio of the composite carbon particles was 1.09. The peak of Si in the Raman spectrum was in the vicinity of 470 cm$^{-1}$, and the value of $I_{Si}/I_G$ was 0.62. In an agate mortar, 10.0 parts by mass of the obtained composite carbon particles and 90.0 parts by mass of SCMG® (manufactured by SHOWA DENKO K.K.) as graphite particles were mixed to obtain a negative electrode material.

Comparative Example 4

A commercially available spherical phenolic resin ($D_{V50}$=7.0 μm) was calcined at 900° C. to obtain a carbonized product (BET specific surface area: 598 m²/g, total pore volume $V_0$: 0.275 cm³/g, $D_{V50}$: 10.6 μm, average aspect ratio: 1.12). The obtained carbonized product was exposed to a silane gas flow in the same manner as in Example 1 to obtain silicon-containing composite carbon particles. The average aspect ratio of the composite carbon particles was 1.12. The peak of Si in the Raman spectrum was in the vicinity of 470 cm⁻¹, and the value of $I_{Si}/I_G$ was 0.51.

In an agate mortar, 10.0 parts by mass of the obtained composite carbon particles and 90.0 parts by mass of SCMG® (manufactured by SHOWA DENKO K.K.) as graphite particles were mixed to obtain a negative electrode material.

Comparative Example 5

Silicon-containing composite carbon particles were obtained by subjecting carbon molecular sieve (manufactured by Merck, Carboxen®-1000 pulverized product, BET specific surface area: 1200 m²/g, total pore volume $V_0$: 0.990 cm³/g, $D_{V50}$: 8.2 μm, average aspect ratio: 1.12) to a silane gas flow in the same manner as in Example 1, followed by pulverization. The average aspect ratio of the composite carbon particles was 1.12. The peak of Si in the Raman spectrum was in the vicinity of 470 cm³, and the value of $I_{Si}/I_G$ was 0.21.

In an agate mortar, 10.0 parts by mass of the obtained composite carbon particles and 90.0 parts by mass of SCMG® (manufactured by SHOWA DENKO K.K.) as graphite particles were mixed to obtain a negative electrode material.

Comparative Example 6

Silicon-containing composite carbon particles were obtained by subjecting carbon molecular sieve (Carbosieve S-3 pulverized product, BET specific surface area: 885 m²/g, total pore volume $V_0$: 0.390 cm³/g, $D_{V50}$: 9.5 μm, average aspect ratio: 1.15) to a silane gas flow in the same manner as in Example 1, followed by pulverization. The average aspect ratio of the composite carbon particles was 1.15. The peak of Si in the Raman spectrum was in the vicinity of 470 cm⁻¹, and the value of $I_{Si}/I_G$ was 0.21.

In an agate mortar, 10.0 parts by mass of the obtained composite carbon particles and 90.0 parts by mass of SCMG® (manufactured by SHOWA DENKO K.K.) as graphite particles were mixed to obtain a negative electrode material.

Comparative Example 7

Commercially available active carbon fiber (FR-20 manufactured by Kuraray Co., Ltd.) was pulverized by a jet mill or the like to obtain a pulverized product of active carbon fiber (BET specific surface area: 1477 m²/g, total pore volume $V_0$: 0.746 cm³/g, $D_{V50}$: 20.1 μm, average aspect ratio: 1.48). The pulverized product of active carbon fiber was exposed to a silane gas flow in the same manner as in Example 1 to obtain silicon-containing composite carbon particles. The average aspect ratio of the composite carbon particles was 1.48. The peak of Si in the Raman spectrum was in the vicinity of 470 cm⁻¹, and the value of $I_{Si}/I_G$ was 0.09.

In an agate mortar, 10.0 parts by mass of the obtained composite carbon particles and 90.0 parts by mass of SCMG® (manufactured by SHOWA DENKO K.K.) as graphite particles were mixed to obtain a negative electrode material.

The above evaluations were performed on the obtained negative electrode material.

The results are summarized in Table 1.

TABLE 1

| | | Ex. 1 | Ex. 2 | Ex. 3 | Ex. 4 | Ex. 5 | Ex. 6 |
|---|---|---|---|---|---|---|---|
| Porous carbon material | Total pore volume $V_0$ [cm³/g] | 0.712 | 0.780 | 0.780 | 0.780 | 0.780 | 0.777 |
| | Cumulative pore volume $V_1$ [cm³/g] | 0.656 | 0.703 | 0.703 | 0.703 | 0.703 | 0.690 |
| | Cumulative pore volume $V_2$ [cm³/g] | 0.052 | 0.067 | 0.067 | 0.067 | 0.067 | 0.053 |
| | Cumulative pore volume $V_3$ [cm³/g] | 0.518 | 0.594 | 0.594 | 0.594 | 0.594 | 0.573 |
| | $V_1/V_0$ | 0.92 | 0.90 | 0.90 | 0.90 | 0.90 | 0.89 |
| | $V_2/V_0$ | 0.07 | 0.09 | 0.09 | 0.09 | 0.09 | 0.07 |
| | $V_3/V_0$ | 0.73 | 0.76 | 0.76 | 0.76 | 0.76 | 0.74 |
| | BET specific surface area [m2/g] | 1630 | 1810 | 1810 | 1810 | 1810 | 1790 |
| Composite carbon particles | Average aspect ratio [—] | 1.15 | 1.01 | 1.02 | 1.03 | 1.03 | 1.01 |
| | Adhesion in pores of silicon | yes | yes | yes | yes | yes | yes |
| | Average circularity | 0.99 | 0.99 | 0.98 | 0.97 | 0.98 | 0.99 |
| | $I_{Si}/I_G$ | 0.21 | 0.11 | 0.07 | 0.06 | 0.08 | 0.21 |
| | R value ($I_D/I_G$) | 1.02 | 1.05 | 1.01 | 1.02 | 1.01 | 1.09 |
| | $D_{V10}$ | 1.0 | 3.1 | 4.2 | 4.4 | 4.8 | 10.8 |
| | $D_{V50}$ | 10.0 | 7.0 | 11.3 | 11.8 | 13.2 | 19.3 |
| | Full width at half maximum of peak of 111 plane of Si [°] | 3.45 | 4.34 | 4.41 | 4.43 | 4.42 | 4.32 |
| | $I_{SiC111}/I_{Si111}$ [—] | 0.00 | 0.00 | 0.00 | 0.00 | 0.00 | 0.00 |
| | Content of silicon component [% by mass] | 45 | 45 | 42 | 42 | 42 | 44 |
| | BET specific surface area [m²/g] | 15.8 | 1.6 | 4.7 | 4.4 | 4.3 | 0.4 |
| Battery characteristics | Initial charge (Li ion release) specific capacity [mAh/g] | 503.1 | 511.2 | 502.3 | 499.1 | 498.4 | 491.2 |
| | Initial coulombic efficiency [%] | 91.4 | 89.6 | 89.5 | 89.5 | 89.6 | 91.5 |
| | Capacity retention rate after 50 cycles (half cell) | 88.2% | 89.5% | 93.2% | 93.9% | 93.8% | 80.9% |
| | in-situ Expansion rate | 13.1% | 11.0% | 9.3% | 9.2% | 9.4% | 13.9% |
| | Expansion/swelling Electrode mixture layer thickness after full charge during aging vs. Electrode mixture layer thickness immediately after pressing | | | | | | |

TABLE 1-continued

| | | | | | | | |
|---|---|---|---|---|---|---|---|
| | Expansion rate Electrode mixture layer thickness after full charge in first cycle vs. Electrode mixture layer thickness after full discharge during aging | 5.3% | 4.3% | 4.0% | 3.8% | 3.9% | 5.5% |
| | Expansion rate Electrode mixture layer thickness after full charge in tenth cycle vs. Electrode mixture layer thickness after full discharge in ninth cycle | 2.2% | 1.7% | 1.5% | 1.5% | 1.6% | 2.4% |
| | Expansion rate Electrode mixture layer thickness after full discharge in tenth cycle vs. Electrode mixture layer thickness after full discharge in first cycle | 2.9% | 2.3% | 1.9% | 1.7% | 1.8% | 2.7% |

| | | | Comp. Ex. 1 | Comp. Ex. 2 | Comp. Ex. 3 | Comp. Ex. 4 |
|---|---|---|---|---|---|---|
| Porous carbon material | | Total pore volume $V_0$ [cm³/g] | 0.626 | 1.920 | 1.030 | 0.275 |
| | | Cumulative pore volume $V_1$ [cm³/g] | 0.439 | 1.368 | 0.874 | 0.227 |
| | | Cumulative pore volume $V_2$ [cm³/g] | 0.026 | 0.009 | 0.001 | 0.000 |
| | | Cumulative pore volume $V_3$ [cm³/g] | 0.357 | 0.921 | 0.578 | 0.214 |
| | | $V_1/V_0$ | 0.70 | 0.71 | 0.85 | 0.83 |
| | | $V_2/V_0$ | 0.04 | 0.00 | 0.00 | 0.00 |
| | | $V_3/V_0$ | 0.57 | 0.48 | 0.56 | 0.78 |
| | | BET specific surface area [m2/g] | 1360 | 3660 | 2183 | 598 |
| Composite carbon particles | | Average aspect ratio [—] | 1.78 | 1.52 | 1.09 | 1.12 |
| | | Adhesion in pores of silicon | yes | yes | yes | yes |
| | | Average circularity | 0.78 | 0.86 | 0.99 | 0.99 |
| | | $I_{Si}/I_G$ | 0.01 | 0.08 | 0.62 | 0.51 |
| | | R value ($I_D/I_G$) | 1.30 | 0.77 | 1.05 | 0.95 |
| | | $D_{V10}$ | 1.6 | 3.7 | 2.9 | 5.3 |
| | | $D_{V50}$ | 5.6 | 9.6 | 6.5 | 10.6 |
| | | Full width at half maximum of peak of 111 plane of Si [°] | 4.23 | 4.38 | 4.29 | 4.33 |
| | | $I_{SiC111}/I_{Si111}$ [—] | 0.00 | 0.00 | 0 | 0 |
| | | Content of silicon component [% by mass] | 40 | 75 | 60 | 4 |
| | | BET specific surface area [m²/g] | 3.0 | 27.1 | 1.1 | 0.8 |
| Battery characteristics | | Initial charge (Li ion release) specific capacity [mAh/g] | 497.3 | 499.5 | 508.1 | 244.0 |
| | | Initial coulombic efficiency [%] | 82.2 | 92.0 | 89.4 | 94.1 |
| | | Capacity retention rate after 50 cycles (half cell) | 69.2% | 72.9% | 75.0% | 113.0% |
| | in-situ Expansion/ swelling | Expansion rate | 28.2% | 21.1% | 28.1% | measurement impossible due to no capacity development |
| | | Expansion rate Electrode mixture layer thickness after full charge during aging vs. Electrode mixture layer thickness immediately after pressing | | | | |
| | | Expansion rate Electrode mixture layer thickness after full charge in first cycle vs. Electrode mixture layer thickness after full discharge during aging | 19.9% | 7.6% | 17.2% | measurement impossible due to no capacity development |
| | | Expansion rate Electrode mixture layer thickness after full charge in tenth cycle vs. Electrode mixture layer thickness after full discharge in ninth cycle | 7.4% | 3.9% | 2.2% | measurement impossible due to no capacity development |
| | | Expansion rate Electrode mixture layer thickness after full discharge in tenth cycle vs. Electrode mixture layer thickness after full discharge in first cycle | 11.1% | 7.8% | 10.5% | measurement impossible due to no capacity development |

| | | | Comp. Ex. 5 | Comp. Ex. 6 | Comp. Ex. 7 |
|---|---|---|---|---|---|
| Porous carbon material | | Total pore volume $V_0$ [cm³/g] | 0.990 | 0.390 | 0.746 |
| | | Cumulative pore volume $V_1$ [cm³/g] | 0.576 | 0.380 | 0.676 |
| | | Cumulative pore volume $V_2$ [cm³/g] | 0.090 | 0.053 | 0.041 |
| | | Cumulative pore volume $V_3$ [cm³/g] | 0.532 | 0.350 | 0.539 |
| | | $V_1/V_0$ | 0.58 | 0.97 | 0.91 |
| | | $V_2/V_0$ | 0.09 | 0.14 | 0.06 |
| | | $V_3/V_0$ | 0.54 | 0.90 | 0.72 |
| | | BET specific surface area [m2/g] | 1200 | 885 | 1744 |
| Composite carbon particles | | Average aspect ratio [—] | 1.12 | 1.15 | 1.48 |
| | | Adhesion in pores of silicon | yes | yes | yes |
| | | Average circularity | 0.96 | 0.96 | 0.68 |
| | | $I_{Si}/I_G$ | 0.21 | 0.21 | 0.09 |
| | | R value ($I_D/I_G$) | 1.03 | 1.04 | 1.06 |
| | | $D_{V10}$ | 3.1 | 3.9 | 11.3 |
| | | $D_{V50}$ | 8.2 | 9.5 | 20.1 |
| | | Full width at half maximum of peak of 111 plane of Si [°] | 4.22 | 4.25 | 4.29 |
| | | $I_{SiC111}/I_{Si111}$ [—] | 0 | 0 | 0 |
| | | Content of silicon component [% by mass] | 59 | 9 | 50 |
| | | BET specific surface area [m²/g] | 3.0 | 1.5 | 0.5 |

TABLE 1-continued

| Battery characteristics | | Initial charge (Li ion release) specific capacity [mAh/g] | 500.9 | 447.5 | 491.4 |
|---|---|---|---|---|---|
| | | Initial coulombic efficiency [%] | 85.4 | 87.3 | 98.0 |
| | | Capacity retention rate after 50 cycles (half cell) | 69.1% | 85.1% | 76.7% |
| | in-situ Expansion/ swelling | Expansion rate Electrode mixture layer thickness after full charge during aging vs. Electrode mixture layer thickness immediately after pressing | 28.1% | 12.3% | 20.0% |
| | | Expansion rate Electrode mixture layer thickness after full charge in first cycle vs. Electrode mixture layer thickness after full discharge during aging | 17.8% | 5.1% | 6.9% |
| | | Expansion rate Electrode mixture layer thickness after full charge in tenth cycle vs. Electrode mixture layer thickness after full discharge in ninth cycle | 6.6% | 2.0% | 4.5% |
| | | Expansion rate Electrode mixture layer thickness after full discharge in tenth cycle vs. Electrode mixture layer thickness after full discharge in first cycle | 9.9% | 2.8% | 6.8% |

From Table 1, it can be seen that the capacity retention rate after 50 cycles is higher in Examples 1 and 2 than in Comparative Example. That is, the cycle characteristics are good.

In Examples 1 and 2, the expansion rate of the electrode and the swelling rate of the electrode at each stage are smaller than those in Comparative Examples 1 and 2. The expansion rate is an index indicating the degree of expansion of the electrode in association with lithium insertion, and the swelling rate is an index indicating a change in the dimensions of the electrode in the same discharge state when lithium insertion and reinsertion are repeated. From these values, it is possible to predict whether the long-term cycle characteristics are good or bad.

In Examples 1 and 2, since the average aspect ratio of the composite carbon particles is smaller than those in Comparative Examples 1 and 2, the shape of the composite carbon particles is isotropic, so that it is possible to suppress the shape change during the insertion and reinsertion of lithium and the cracking of the material, so that it is considered that the expansion rate and the swelling rate of the electrode are small and the capacity retention rate after 50 cycles is high.

In Examples 1 and 2, $V_1/V_0$ is larger than that of Comparative Examples 1 and 2, and the ratio of micropores is higher. Therefore, it is considered that the ratio of mesopores and macropores is small, and there is less silicon having such a pore size. This is considered to be represented by the high capacity retention rate of the electrode after 50 cycles and the small expansion rate and swelling rate.

Further, in Comparative Example 3, in which the $I_{Si}/I_G$ is larger than the range of the present invention, the expansion rate and the swelling rate of the electrode were larger, and the capacity retention rate after 50 cycles was low. In addition, in Comparative Example 4 in which the BET specific surface area was significantly smaller than the range of the present invention, the specific capacity was small, and the expansion rate and the swelling rate could not be evaluated. In Comparative Example 5, in which $V_1/V_0$ is smaller than the range of the present invention, the expansion rate and the swelling rate of the electrode were larger than those of Examples, and the capacity retention rate after 50 cycles was low. Further, in Comparative Example 6, in which $V_2/V_0$ is larger than the range of the present invention, the initial charge specific capacity was smaller and the expansion rate and the swelling rate of the electrode were larger than those of Examples. In Comparative Example 7, in which the average aspect ratio was larger than the range of the present invention, the expansion rate and the swelling rate of the electrode were larger than those of Examples, and the capacity retention rate after 50 cycles was low.

In Example 3 to 5, the capacity retention rate after 50 cycles, the expansion rate and the swelling rate were further improved after 50 cycles than in Examples 1 and 2. The present inventors consider that this is because the polymer and the conductive particles were present around the composite carbon particles, the presence of the polymer suppressed the electrode expansion and swelling, and the electron conductivity was improved due to the conductive particles.

As described above, it has been found that by satisfying the predetermined range of the present invention, it is possible to provide a lithium-ion secondary battery having good cycle characteristics and small electrode expansion.

In Comparative Example 4, the capacity retention rate after 50 cycles exceeded 100%. This is due to the extremely small developed capacity of 244 mAh/g at the initial stage of the cycle, which makes the active material extremely difficult to use. That is, at the initial stage of the cycle, it is difficult for Li$^+$ to react with the active material, which means that the active material can be effectively used only after the cycle. The material exhibiting such behavior is not stable in capacity development during the cycle test, and is unsuitable for use as a negative electrode material.

The invention claimed is:

1. Composite carbon particles comprising a porous carbon material and a silicon component, the composite carbon particle having an average aspect ratio of 1.25 or less, and a ratio ($I_{Si}/I_G$) of a peak intensity ($I_{Si}$) in the vicinity of 470 cm$^{-1}$ to a peak intensity ($I_G$) in the vicinity of 1580 cm$^{-1}$ as measured by Raman spectroscopy of 0.30 or less,
wherein the porous carbon material satisfies $V_1/V_0>0.80$ and $V_2/V_0<0.10$,
when a total pore volume at a maximum value of a relative pressure $P/P_0$ is defined as $V_0$ and $P_0$ is a saturated vapor pressure,
a cumulative pore volume at a relative pressure $P/P_0=0.1$ is defined as $V_1$,
a cumulative pore volume at a relative pressure $P/P_0=10^{-7}$ is defined as $V_2$ in a nitrogen adsorption test,
and has a BET specific surface area of 800 m$^2$/g or more.

2. The composite carbon particles according to claim 1, wherein the porous carbon material satisfies $V_3/V_0>0.50$, when a cumulative pore volume at the relative pressure $P/P_0=10^{-2}$ is defined as $V_3$ in the nitrogen adsorption test.

3. The composite carbon particles according to claim 1, wherein the silicon component is adhered to inner wall of pores of the porous carbon material.

4. The composite carbon particles according to claim 1, wherein a 50% particle size ($D_{V50}$) in a volume-based cumulative particle size distribution by laser diffraction method is 4.0 μm or more and 30.0 μm or less, a 10% particle size ($D_{V10}$) is 1.0 μm or more, and the BET specific surface area is 0.50 m$^2$/g or more and 40.0 m$^2$/g or less.

5. The composite carbon particles according to claim 1, wherein an R value ($I_D/I_G$), which is a ratio of a peak intensity ($I_D$) in the vicinity of 1350 cm-1 to a peak intensity ($I_G$) in the vicinity of 1580 cm$^{-1}$ in a Raman spectrum, is 0.80 or more and 1.50 or less.

6. The composite carbon particles according to claim 1, wherein in an XRD pattern using a Cu-Kα ray, a full width at half maximum of a peak of a 111 plane of Si is 3.00° or more and (peak intensity of a 111 plane of SiC)/(peak intensity of the 111 plane of Si) is 0.01 or less.

7. The composite carbon particles according to claim 1, wherein a content of the silicon component in the composite carbon particles is 15% by mass or more and 85% by mass or less.

8. The composite carbon particles according to claim 1, wherein the composite carbon particle has an average circularity of 0.95 or more and 1.00 or less.

9. The composite carbon particles according to claim 1, further comprising inorganic particles and a polymer on a portion or the entire surface of the composite carbon particles, wherein the inorganic particles contain one or more selected from graphite and carbon black, and a content of the polymer is 0.1 to 10.0% by mass.

10. An electrode material for a lithium-ion secondary battery comprising the composite carbon particles according to claim 1.

11. A negative electrode material comprising the composite carbon particles according to claim 1.

12. A negative electrode mixture layer comprising the negative electrode material according to claim 11.

13. A lithium-ion secondary battery comprising the negative electrode mixture layer according to claim 12.

\* \* \* \* \*